United States Patent
Nakamura

(10) Patent No.: US 8,094,332 B2
(45) Date of Patent: Jan. 10, 2012

(54) PRINT PROCESSING UTILIZING MULTIPLE PRINTER DRIVERS

(75) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1160 days.

(21) Appl. No.: 11/687,194

(22) Filed: Mar. 16, 2007

(65) Prior Publication Data

US 2007/0216925 A1 Sep. 20, 2007

(30) Foreign Application Priority Data

Mar. 17, 2006 (JP) ................................. 2006-075550

(51) Int. Cl.
*G06F 3/12* (2006.01)
(52) U.S. Cl. ..................... 358/1.15; 358/1.14; 358/1.13; 719/321; 719/327
(58) Field of Classification Search ................. 358/1.13, 358/1.14, 1.15; 719/321, 327
See application file for complete search history.

(56) References Cited

U.S. PATENT DOCUMENTS

| | | | | |
|---|---|---|---|---|
| 2003/0234950 A1* | 12/2003 | Lay | ............................... | 358/1.14 |
| 2004/0141203 A1* | 7/2004 | Honma | ......................... | 358/1.15 |
| 2005/0094193 A1* | 5/2005 | Oswald | ........................ | 358/1.15 |
| 2005/0102508 A1* | 5/2005 | Kim | ............................... | 713/165 |
| 2006/0146353 A1* | 7/2006 | Yue et al. | ...................... | 358/1.13 |
| 2006/0221361 A1* | 10/2006 | Takagi | ............................ | 358/1.1 |
| 2007/0053000 A1 | 3/2007 | Nakamura | | |
| 2007/0216939 A1* | 9/2007 | Wada et al. | ................... | 358/1.15 |
| 2007/0216944 A1* | 9/2007 | Furuya | ........................... | 358/1.15 |
| 2008/0186516 A1* | 8/2008 | Tayama | ......................... | 358/1.2 |
| 2009/0268234 A1* | 10/2009 | Furuya | ........................ | 358/1.15 |

OTHER PUBLICATIONS

"Advances in Windows Printing", Microsoft Corporation, WinHEC, May 7, 2004.*
Microsoft Corporation, "Advances in Windows Printing", WinHEC, May 7, 2004 [searched on Feb. 28, 2005, <http://www.microsoft.com/whdc/device/print/default.mxps>].
Emerson, Daniel, "Advances in Window Printing", Microsoft Corp., http:www.microsoft.com/whdc/device/print/default.mspx (Advances in Windows Printing: TWPRO5001_WinHEC05.ppt), WinHEC Seattle, 2005.

* cited by examiner

*Primary Examiner* — King Poon
*Assistant Examiner* — Jacky X Zheng
(74) *Attorney, Agent, or Firm* — Fitzpatrick, Cella, Harper & Scinto

(57) ABSTRACT

It is analyzed on the basis of received print data whether the print data is print data generated via a process path formed from a combination of the first application and first printer driver, or print data generated via a process path formed from a combination of the second application and second printer driver. Settings associated with the process of print data are made for each process path. The process of the received print data is controlled on the basis of the analysis result and setting contents.

6 Claims, 20 Drawing Sheets

FIG. 10

Subject : Driver Warning
To : Administrator
From : Printer1

Undesirable driver is used for Printer1
User : user1
IP address : X.X.X.X
Date : 2005/12/31

FIG. 11

```
<d:Hello>
  <a:EndpointReference>
    <a:Address>uuid:98190dc2-0890-4ef8-1234567890ab</a:Address>
  </a:EndpointReference>
  <d:MetadataVersion>75965</d:MetadataVersion>
</d:Hello>
```

1101

F I G. 12
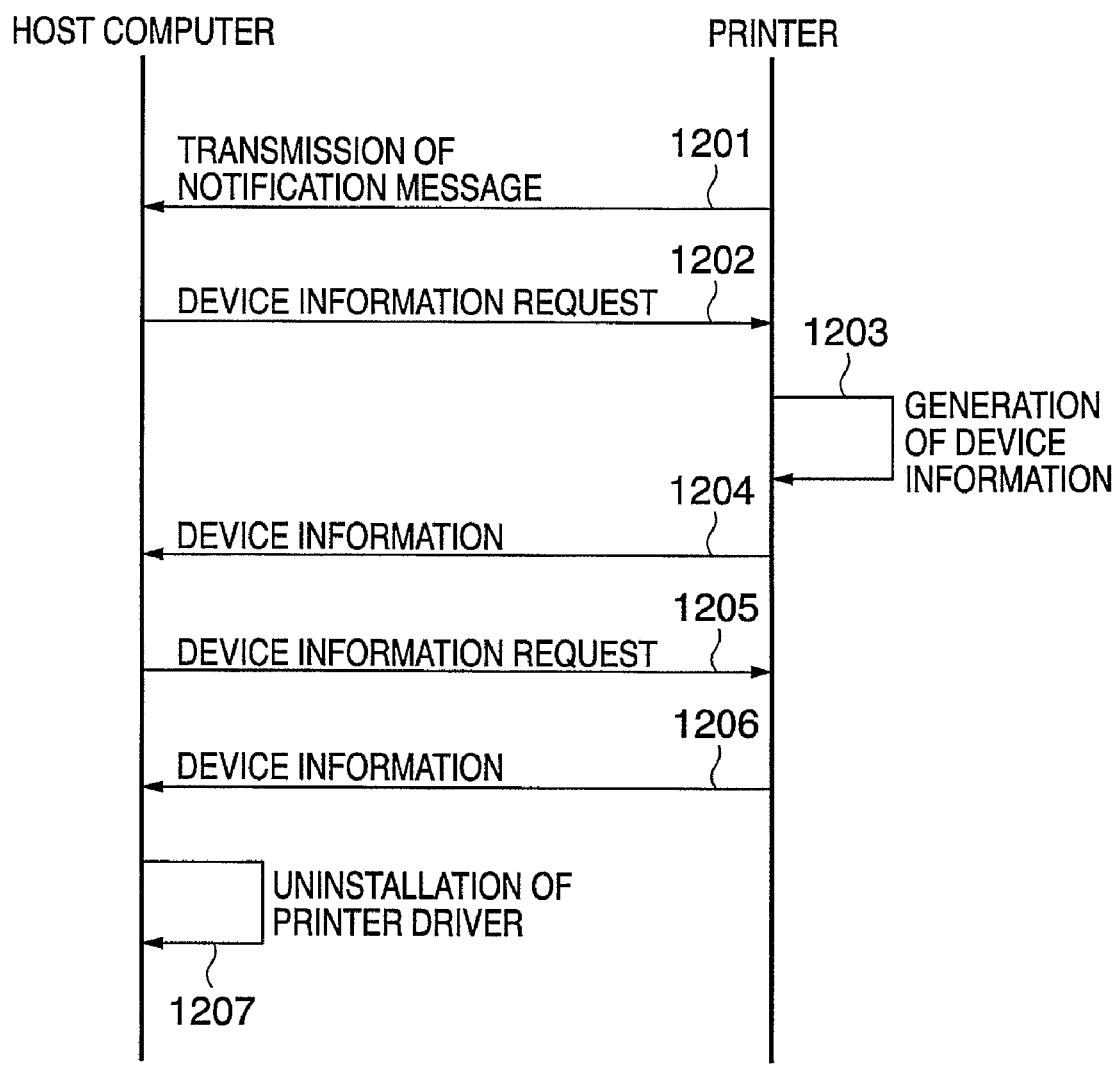

FIG. 13

```
<Metadata>
        <Service>
                <EndpointReference>
                        <Address>http://192.168.0.1/print</Address>
                </EndpointReference>
                <Types>PrintService</Types>
                <ServiceId>1</ServiceId>
        </Service>
        <Service>
        ...
        </Service>
</Metadata>
```

FIG. 14

```
<Metadata>
  <PrinterMetadata>
    <PrinterName>Printer in Copy Room</PrinterName>
    <DeviceId>CLS:PRINTER;MFG:ABC;MDL:LBP-XXX PDL1(XPS);CMD:PDL1,IEEE1284</DeviceId>
  </PrinterMetadata>
</Metadata>
```

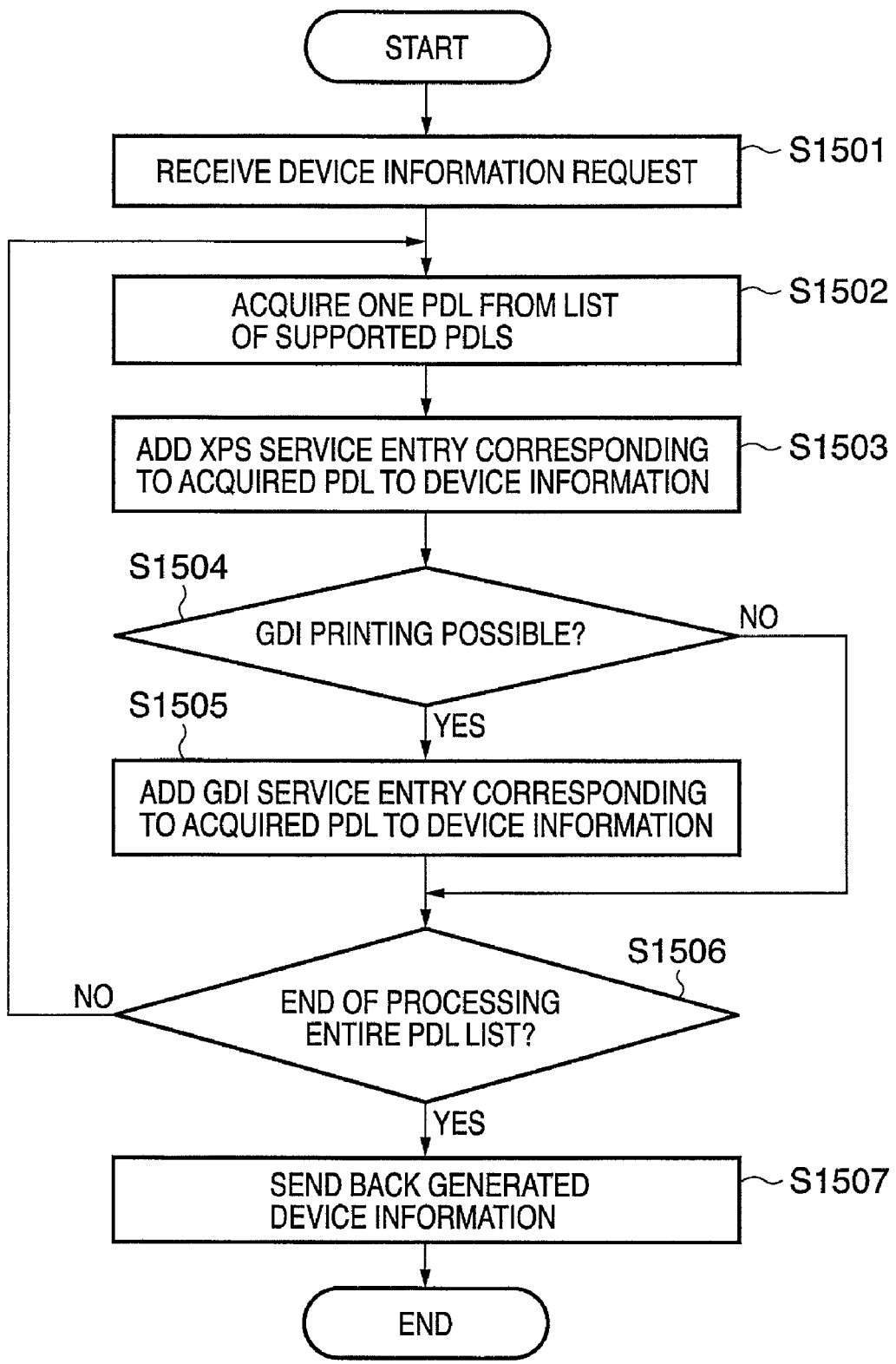

FIG. 16B

PrintTicket 1601

```
<?xml version="1.0" encoding="UTF-8"?>
<psf:PrintTicket xmlns:psf="http://schemas.microsoft.com/.../printschemaframework"
    xmlns:xsi="http://www.w3.org/.../XMLSchema-instance"
    xmlns:xsd="http://www.w3.org/.../XMLSchema" version="1"
    xmlns:myns="http://www.myns.com/ns/printing/"
    xmlns:psk="http://Schemas.microsoft.com/.../printschema.keywords">
  <psf:Feature name="psk:PageMediaSize">
    <psf:Option name="psk:ISOA4"/>
  </psf:Feature>
  <psf:Feature name="psk:JobDuplex">
    <psf:Option name="psk:OneSided"/>
  </psf:Feature>
  ...
</psf:PrintTicket>
```

DEVMODE 1602

```
Devmode{
    WORD dmDriverVersion    : 1.00
    short dmPaperSize       : DMPAPER_A4
    short dmCopies          : 1
    short dmColor           : DMCOLOR_MONOCHROME
    short dmDupulex         : DMUP_SIMPLEX
    ...
    short dmConvertFlag     : DM_CNV_PTTODEVMODE
}
```
1603

PRINT PROCESSING UTILIZING MULTIPLE PRINTER DRIVERS

BACKGROUND OF THE INVENTION

1. Field of the Invention

The present invention relates to an image forming apparatus which receives print data and prints, a control method therefor, and a program.

2. Description of the Related Art

An application on a host computer prints an image or text from a printing apparatus by generally using an arrangement as shown in FIG. 1.

More specifically, an application 101 on a host computer 3000 passes graphics data to a graphics engine 103. The graphics engine 103 processes the graphics data and passes it to a printer driver 104. The printer driver 104 generates print data (e.g., PDL: Page Description Language) to a printer 1500. The print data is stored in a spooler 105 and then sent to the printer 1500.

In particular, the graphics engine 103 converts the resolution of graphics data created by the application 101, and processes graphics data by a simulation process or the like in accordance with the performance of the printer driver 104. The graphics engine 103 allows the application 101 and printer driver 104 to operate independently of each other. The graphics engine 103 is generally provided as part of an OS (Operating System) 102.

The number of graphics engines 103 is not always one, but may be two or more.

For example, Microsoft held a hardware engineering conference WinHEC 2005 in Seattle, U.S.A., in 2005. At this conference, Microsoft announced that a new Microsoft OS (Windows® Vista) supports two graphics engines (GDI 202 and WPF 212) as shown in FIG. 2 (Advances in Windows® Printing: TWPR05001_WinHEC05.ppt). The WPF stands for "Windows® Presentation Foundation."

A conventional Microsoft printing system utilizes a graphics engine "GDI" from an application using an API called a Win32API, and creates print data from graphics data by a printer driver called from the GDI. This print process sequence is called a GDI print path.

The API stands for Application Programming Interface. The GDI stands for Graphic Device Interface. An application using the Win32API will be referred to as a Win32 application 201. A printer driver called from the GDI will be referred to as a GDI printer driver 203.

According to Windows® Vista, a new print process sequence called an XPS print path is added to the conventional GDI print path. The XPS print path is a print process sequence to convert XPS graphics data into print data by the printer driver using a graphics engine "WPF" from an application using a WinFxAPI.

The XPS stands for XML Paper Specification. An application using the WinFxAPI will be referred to as a WinFx application 211. A printer driver which processes XPS graphics data will be referred to as an XPS printer driver 213.

In Windows® Vista, applications are classified into two types: the Win32 application 201 and WinFx application 211. The OS 102 supports the two graphics engines, i.e., the GDI 202 and WPF 212.

The Win32 application 201 passes graphics data to the GDI 202, whereas the WinFx application 211 passes graphics data to the WPF 212. Printer drivers are classified into two types: the GDI printer driver 203 and XPS printer driver 213. The GDI printer driver 203 receives graphics data from the GDI 202, and changes it into print data for the printer 1500. The XPS printer driver 213 receives graphics data from the WPF 212 and changes it into print data for the printer 1500. Print data created by each printer driver is transmitted to the printer 1500 via the spooler 105.

These graphics engines, i.e., GDI 202 and WPF 212 can cooperate with each other. With this cooperation, the Win32 application 201 can pass graphics data to the XPS printer driver 213, and the WinFx application 211 can pass graphics data to the GDI printer driver 203.

The cooperative mechanism of the two graphics engines in Windows® Vista will be explained with reference to FIG. 3.

Print process sequence (1) represents a conventional GDI print path. Rendering data passed from the Win32 application 201 is stored as an EMF (Enhanced Metafile) spool file 301 in the GDI 202. Then, the GDI printer driver 203 converts the EMF spool file 301 into print data.

Print process sequence (4) represents an XPS print path added in Windows® Vista. Rendering data passed from the WinFx application 211 is stored as an XPS spool file 311 in the WPF 212. Then, the XPS printer driver 213 converts the XPS spool file 311 into print data.

Print process sequence (3) represents a print process sequence when the GDI printer driver 203 prints graphics data from the WinFx application 211. Rendering data passed from the WinFx application 211 is converted into EMF graphics data by an XPS→GDI conversion module 312 via the WPF 212, and stored as the EMF spool file 301. Then, the GDI printer driver 203 converts the EMF spool file 301 into print data.

Print process sequence (2) represents a process sequence when the XPS printer driver 213 prints graphics data from the Win32 application 201. Rendering data passed from the Win32 application 201 is converted into XPS graphics data by a GDI→XPS conversion module 302 via the GDI 202, and stored as the XPS spool file 311. Then, the XPS printer driver 213 converts the XPS spool file 311 into print data.

In Windows® Vista, the four print process sequences are prepared. Either the GDI printer driver 203 or XPS printer driver 213 is prepared as a printer driver for a printer and can cope with print processes from both the Win32 application 201 and WinFx application 211.

When giving attention to the XPS format itself, the XPS format can have a security function, which is a feature of the XPS format. For example, an electronic signature can be added to XPS document data to detect tampering of the document data. The use of the electronic signature adding function proposes security solutions in cooperation with a printer.

For example, a printing system in which a printer has the electronic signature verification function can be built. In this printing system, the printer verifies an electronic signature added to a received XPS document, and prints only when determining that no tampering of the document has occurred.

For example, patent reference 1 proposes a technique of analyzing received print data by the printer to determine whether to actually print it. According to patent reference 1, the determination method adopts a criterion for judging whether a job attribute designated by print data is processible.

However, the XPS and EMF formats are different. The print quality, print function, and print speed may degrade in a print process sequence in which graphics data conversion may occur, like print process sequences (2) and (3) in FIG. 3.

In terms of the print quality, for example, graphics data containing a logical operation such as ROP (Raster OPeration), which is supported by the EMF format, is not supported by the XPS format in print process sequence (2). Depending on specifications determined by Microsoft, logical operation information may be omitted when the GDI→XPS conversion module 302 converts logical operation-containing graphics data. When the XPS printer driver 213 receives graphics data having no logical operation information, it may not create an output result intended by the Win32 application 201.

To the contrary, advanced graphics graphics data supported by the XPS format is not supported by the EMF format in print process sequence (3). The XPS→GDI conversion module 312 performs local bitmap "Flattering" when converting XPS graphics data into GDI one. In this case, graphics data is converted into bitmap data, and the GDI printer driver 203 cannot determine the original object attribute, failing to create any optimum output result.

In print process sequence (2) or (3), therefore, a print result output from the printer may degrade in quality from what the user intends.

In terms of security, for example, electronic signature information supported by the XPS format is not supported by the EMF format in print process sequence (3). After an XPS document passes through print process sequence (3), electronic signature information added to the document is lost, and the printer must print by a conventional system. In this case, printing by a malicious user by intentionally avoiding the security restriction may not be prevented.

SUMMARY OF THE INVENTION

The present invention has been made to overcome the conventional drawbacks, and has as the first object to provide an image forming apparatus capable of preventing illicit printing or degradation of the print quality, a control method therefor, and a program.

It is the second object to provide an image forming apparatus capable of minimizing outputs at poor print quality, a control method therefor, and a program.

According to the present invention, the foregoing object is attained by providing an image forming apparatus which prints by receiving print data generated by an information processing apparatus that operates a first graphics unit that generates first graphics data processible by a first printer driver in accordance with a print instruction from a first application, and a second graphics unit that generates second graphics data processible by a second printer driver in accordance with a print instruction from a second application, comprising:

receiving means for receiving print data from the information processing apparatus;

analysis means for analyzing, on the basis of the print data received by the receiving means, whether the print data is print data generated via a process path formed from a combination of the first application and the first printer driver, or print data generated via a process path formed from a combination of the second application and the second printer driver;

setting means for making a setting associated with a process of the print data for each process path; and control means for controlling the process of the print data received by the receiving means on the basis of an analysis result of the analysis means and setting contents of the setting means.

In a preferred embodiment, the setting means includes an item to set whether to inhibit (prevent) printing of print data generated via a process path formed from a combination of the first application and the second printer driver or print data generated via a process path formed from a combination of the second application and the first printer driver, and an item to set whether to notify a designated notification destination of information.

In a preferred embodiment, the analysis means analyzes a combination of an application and a printer driver used to generate print data, on the basis of information representing execution/non-execution of a graphics data conversion process and a driver type of a designated printer driver that are contained in the print data.

In a preferred embodiment, the control means controls to inhibit printing of the print data when the combination is a specific combination as a result of the analysis by the analysis means and inhibition of printing when the combination is the specific combination is set as the setting contents of the setting means.

In a preferred embodiment, the control means further comprises notification means for notifying the designated notification destination of information of a control result by the control means on the basis of the analysis result of the analysis means and the setting contents of the setting means.

In a preferred embodiment, the notification means notifies the information processing apparatus of identification information representing a printer driver capable of generating print data printable by the image forming apparatus.

According to the present invention, the foregoing object is attained by providing an image forming apparatus which prints by receiving print data generated by an information processing apparatus that operates a first graphics unit that generates first graphics data processible by a first printer driver in accordance with a print instruction from a first applications and a second graphics unit that generates second graphics data processible by a second printer driver in accordance with a print instruction from a second application, comprising:

receiving means for receiving print data from the information processing apparatus;

analysis means for analyzing, on the basis of the print data received by the receiving means, whether the print data is print data generated via a process path formed from a combination of the first application and the first printer driver, or print data generated via a process path formed from a combination of the second application and the second printer driver; and control means for controlling to inhibit printing of the print data received by the receiving means when the analysis means analyzes that the print data was generated via neither the process path formed from the combination of the first application and the first printer driver nor the process path formed from the combination of the second application and the second printer driver.

According to the present invention, the foregoing object is attained by providing an image forming apparatus which prints by receiving print data generated by an information processing apparatus that operates a first graphics unit that generates first graphics data processible by a first printer driver in accordance with a print instruction from a first application, and a second graphics unit that generates second graphics data processible by a second printer driver in accordance with a print instruction from a second application, comprising:

receiving means for receiving print data from the information processing apparatus;

analysis means for analyzing, on the basis of the print data received by the receiving means, whether the print data is print data generated via a process path which is formed from a combination of the first application and the second printer driver and accompanied by graphics conversion, or print data generated via a process path which is formed from a combination of the second application and the first printer driver and accompanied by graphics conversion;

specifying means for specifying a type of printer driver not accompanied by graphics conversion when the analysis means analyzes that the print data was generated via the process path which is formed from the combination of the first application and the second printer driver and accompanied by graphics conversion, or via the process path which is formed from the combination of the second application and the first printer driver and accompanied by graphics conversion; and notification means for notifying the information processing apparatus of device information containing the type of printer driver specified by the specifying means.

In a preferred embodiment, the specifying means specifies the first printer driver when the analysis means analyzes that the print data was not generated via a process path formed from a combination of the first application and the first printer driver, and the specifying means specifies the second printer driver when the analysis means analyzes that the print data was not generated via a process path formed from a combination of the second application and the second printer driver.

In a preferred embodiment, the specifying means executes a printer driver specifying process when a device search message is received from the information processing apparatus, and the notification means notifies the device information to a message transmitting side indicated by message transmitting side information contained in the device search message.

According to the present invention, the foregoing object is attained by providing an image forming apparatus which prints by receiving print data generated by an information processing apparatus that operates a first graphics unit that generates first graphics data processible by a first printer driver in accordance with a print instruction from a first application, and a second graphics unit that generates second graphics data processible by a second printer driver in accordance with a print instruction from a second application, comprising:

receiving means for receiving print data from the information processing apparatus;

analysis means for analyzing, on the basis of the print data received by the receiving means, whether a process path is to convert the second graphics data into the first graphics data and output the first graphics data to the second printer driver; and control means for controlling to inhibit printing of the print data received by the receiving means when the analysis means analyzes that the print data was generated via the process path to convert the second graphics data into the first graphics data and output the first graphics data to the first printer driver.

According to the present invention, the foregoing object is attained by providing a method of controlling an image forming apparatus which prints by receiving print data generated by an information processing apparatus that operates a first graphics unit that generates first graphics data processible by a first printer driver in accordance with a print instruction from a first application, and a second graphics unit that generates second graphics data processible by a second printer driver in accordance with a print instruction from a second application, comprising:

a receiving step of receiving print data from the information processing apparatus;

an analysis step of analyzing, on the basis of the print data received in the receiving step, whether the print data is print data generated via a process path formed from a combination of the first application and the first printer driver, or print data generated via a process path formed from a combination of the second application and the second printer driver;

a setting step of making a setting associated with a process of the print data for each process path; and a control step of controlling the process of the print data received in the receiving step on the basis of an analysis result of the analysis step and setting contents of the setting step.

According to the present invention, the foregoing object is attained by providing a method of controlling an image forming apparatus which prints by receiving print data generated by an information processing apparatus that operates a first graphics unit that generates first graphics data processible by a first printer driver in accordance with a print instruction from a first application, and a second graphics unit that generates second graphics data processible by a second printer driver in accordance with a print instruction from a second application, comprising:

a receiving step of receiving print data from the information processing apparatus;

an analysis step of analyzing, on the basis of the print data received in the receiving step, whether the print data is print data generated via a process path formed from a combination of the first application and the first printer driver, or print data generated via a process path formed from a combination of the second application and the second printer driver; and a control step of controlling to inhibit printing of the print data received in the receiving step when the print data is analyzed in the analysis step to have been generated via neither the process path formed from the combination of the first application and the first printer driver nor the process path formed from the combination of the second application and the second printer driver.

According to the present invention, the foregoing object is attained by providing a method of controlling an image forming apparatus which prints by receiving print data generated by an information processing apparatus that operates a first graphics unit that generates first graphics data processible by a first printer driver in accordance with a print instruction from a first application, and a second graphics unit that generates second graphics data processible by a second printer driver in accordance with a print instruction from a second application, comprising:

a receiving step of receiving print data from the information processing apparatus;

an analysis step of analyzing, on the basis of the print data received in the receiving step, whether the print data is print data generated via a process path which is formed from a combination of the first application and the second printer driver and accompanied by graphics conversion, or print data generated via a process path which is formed from a combination of the second application and the first printer driver and accompanied by graphics conversion;

a specifying step of specifying a type of printer driver not accompanied by graphics conversion when the print data is analyzed in the analysis step to have been generated via the process path which is formed from the combination of the first application and the second printer driver and accompanied by graphics conversion, or via the process path which is formed from the combination of the second application and the first printer driver and accompanied by graphics conversion; and a notification step of notifying the information processing apparatus of device information containing the type of printer driver specified in the specifying step.

According to the present invention, the foregoing object is attained by providing a method of controlling an image forming apparatus which prints by receiving print data generated by an information processing apparatus that operates a first graphics unit that generates first graphics data processible by a first printer driver in accordance with a print instruction from a first application, and a second graphics unit that generates second graphics data processible by a second printer driver in accordance with a print instruction from a second applications comprising:

a receiving step of receiving print data from the information processing apparatus;

an analysis step of analyzing, on the basis of the print data received in the receiving step, whether a process path is to convert the second graphics data into the first graphics data and output the first graphics data to the first printer driver; and a control step of controlling to inhibit printing of the print data received in the receiving step when the print data is analyzed in the analysis step to have been generated via the process path to convert the second graphics data into the first graphics data and output the first graphics data to the first printer driver.

According to the present invention, the foregoing object is attained by providing a program which causes a computer to control an image forming apparatus which prints by receiving print data generated by an information processing apparatus that operates a first graphics unit that generates first graphics data processible by a first printer driver in accordance with a print instruction from a first application, and a second graphics unit that generates second graphics data processible by a second printer driver in accordance with a print instruction from a second application, by causing the computer to execute a receiving step of receiving print data from the information processing apparatus, an analysis step of analyzing, on the basis of the print data received in the receiving step, whether the print data is print data generated via a process path formed from a combination of the first application and the first printer driver, or print data generated via a process path formed from a combination of the second application and the second printer driver, a setting step of making a setting associated with a process of the print data for each process path, and a control step of controlling the process of the print data received in the receiving step on the basis of an analysis result of the analysis step and setting contents of the setting step.

According to the present invention, the foregoing object is attained by providing a program which is stored in a computer-readable medium and causes a computer to control an image forming apparatus which prints by receiving print data generated by an information processing apparatus that operates a first graphics unit that generates first graphics data processible by a first printer driver in accordance with a print instruction from a first application, and a second graphics unit that generates second graphics data processible by a second printer driver in accordance with a print instruction from a second application, by causing the computer to execute a receiving step of receiving print data from the information processing apparatus, an analysis step of analyzing, on the basis of the print data received in the receiving step, whether the print data is print data generated via a process path formed from a combination of the first application and the first printer driver, or print data generated via a process path formed from a combination of the second application and the second printer driver, and a control step of controlling to inhibit printing of the print data received in the receiving step when the print data is analyzed in the analysis step to have been generated via neither the process path formed from the combination of the first application and the first printer driver nor the process path formed from the combination of the second application and the second printer driver.

According to the present invention, the foregoing object is attained by providing a program which is stored in a computer-readable medium and causes a computer to control an image forming apparatus which prints by receiving print data generated by an information processing apparatus that operates a first graphics unit that generates first graphics data processible by a first printer driver in accordance with a print instruction from a first application, and a second graphics unit that generates second graphics data processible by a second printer driver in accordance with a print instruction from a second application, by causing the computer to execute a receiving step of receiving print data from the information processing apparatus, an analysis step of analyzing, on the basis of the print data received in the receiving step, whether the print data is print data generated via a process path which is formed from a combination of the first application and the second printer driver and accompanied by graphics conversion, or print data generated via a process path which is formed from a combination of the second application and the first printer driver and accompanied by graphics conversion, a specifying step of specifying a type of printer driver not accompanied by graphics conversion when the print data is analyzed in the analysis step to have been generated via the process path which is formed from the combination of the first application and the second printer driver and accompanied by graphics conversion, or via the process path which is formed from the combination of the second application and the first printer driver and accompanied by graphics conversion, and a notification step of notifying the information processing apparatus of device information containing the type of printer driver specified in the specifying step.

According to the present invention, the foregoing object is attained by providing a program which is stored in a computer-readable medium and causes a computer to control an image forming apparatus which prints by receiving print data generated by an information processing apparatus that operates a first graphics unit that generates first graphics data processible by a first printer driver in accordance with a print instruction from a first application, and a second graphics unit that generates second graphics data processible by a second printer driver in accordance with a print instruction from a second application, comprising:

a receiving step of receiving print data from the information processing apparatus;

an analysis step of analyzing, on the basis of the print data received in the receiving step, whether a process path is to convert the second graphics data into the first graphics data and output the first graphics data to the first printer driver; and a control step of controlling to inhibit printing of the print data received in the receiving step when the print data is analyzed in the analysis step to have been generated via the process path to convert the second graphics data into the first graphics data and output the first graphics data to the first printer driver.

Further features of the present invention will be apparent from the following description of exemplary embodiments with reference to the attached drawings.

BRIEF DESCRIPTION OF THE DRAWINGS

FIG. 10 is a view showing an example of email sent from the printer to the administrator according to the embodiment of the present invention;

FIG. 11 is a view showing an example of a notification message sent from the printer to the host computer according to the embodiment of the present invention;

FIG. 12 is a chart showing a GDI printer driver uninstallation sequence according to the embodiment of the present invention;

FIG. 13 is a view showing an example of device information transmitted from the printer according to the embodiment of the present invention;

FIG. 14 is a view showing an example of service information transmitted from the printer according to the embodiment of the present invention;

FIG. 15 is a flowchart showing a process when the printer, which has received a device information request, generates device information according to the embodiment of the present invention;

FIG. 16B is a view for explaining how to set a conversion flag representing that conversion has been executed when PrintTicket is converted into DEVMODE according to the embodiment of the present invention;

DESCRIPTION OF THE EMBODIMENTS

A preferred embodiment of the present invention will now be described in detail with reference to the drawings. It should be noted that the relative arrangement of the components, the numerical expressions and numerical values set forth in the embodiment do not limit the scope of the present invention unless it is specifically stated otherwise.

Figure 3:
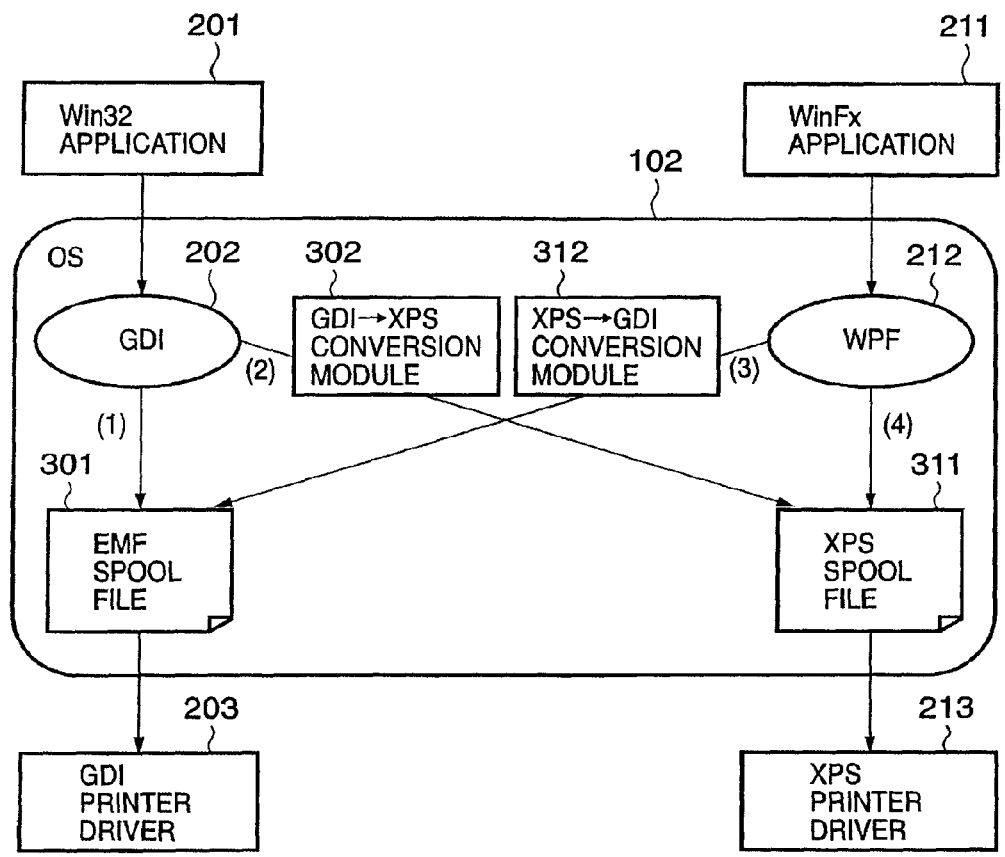
FIG. 3 is a block diagram showing a mechanism in which two graphics engines coexist in Windows® Vista.

FIG. 3 is a block diagram for explaining the cooperative mechanism of two graphics engines in Windows® Vista.

Print process sequence (1) represents a conventional GDI print path. Rendering data passed from a Win32 application 201 is stored as an EMF spool file 301 in a GDI 202. Then, a GDI printer driver 203 converts the EMF spool file 301 into print data.

Print process sequence (4) represents an XPS print path added in Windows® Vista. Rendering data passed from a WinFx application 211 is stored as an XPS spool file 311 in a WPF 212. Then, an XPS printer driver 213 converts the XPS spool file 311 into print data.

Print process sequence (3) represents a print process sequence when the GDI printer driver 203 prints graphics data from the WinFx application 211. Rendering data passed from the WinFx application 211 is converted into EMF graphics data by an XPS→GDI conversion module 312 via the WPF 212, and stored as the EMF spool file 301. Then, the GDI printer driver 203 converts the EMF spool file 301 into print data.

Print process sequence (2) represents a process sequence when the XPS printer driver 213 prints graphics data from the Win32 application 201. Rendering data passed from the Win32 application 201 is converted into XPS graphics data by a GDI→XPS conversion module 302 via the GDI 202, and stored as the XPS spool file 311. Then, the XPS printer driver 213 converts the XPS spool file 311 into print data.

In Windows® Vista, the four print process sequences are prepared. Either the GDI printer driver 203 or XPS printer driver 213 is prepared as a printer driver for a printer and can cope with print processes from both the Win32 application 201 and WinFx application 211.

Figure 1:
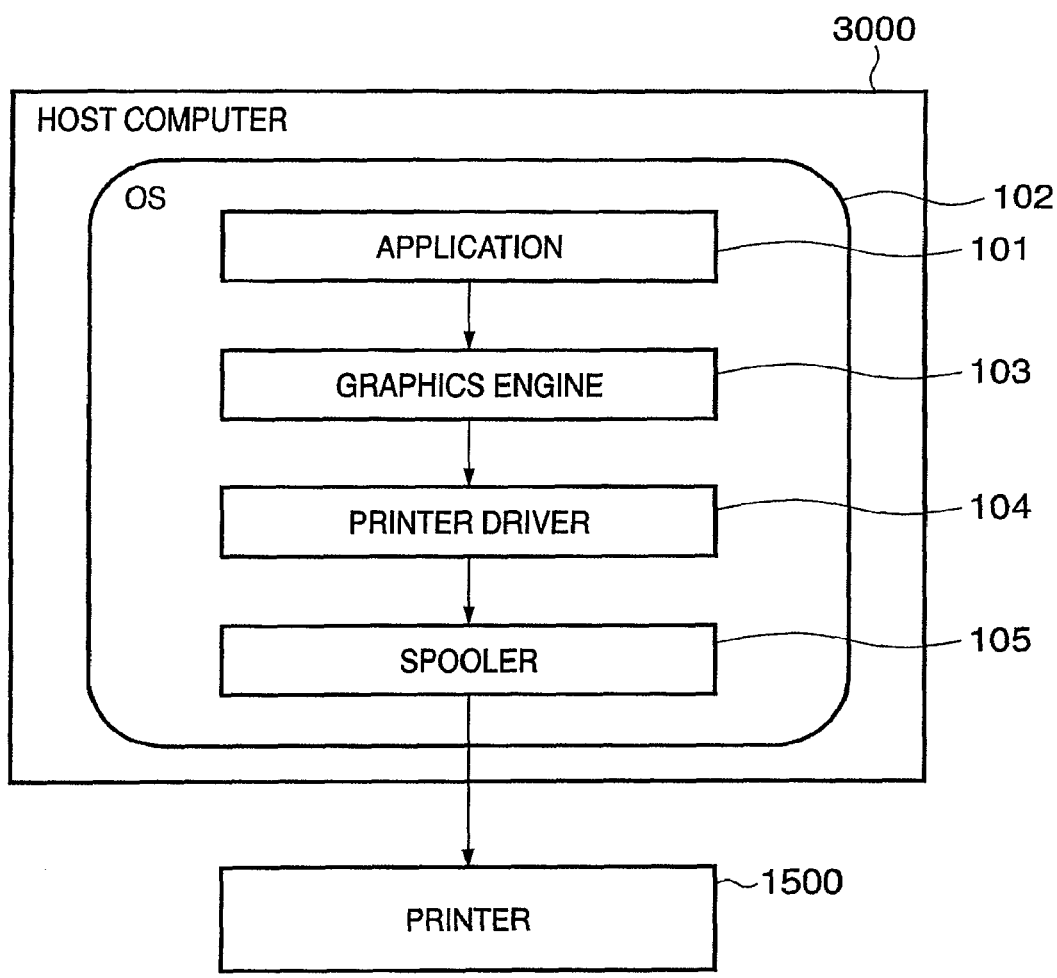
FIG. 1 is a block diagram showing a general print process sequence and components for the print process.
Figure 2:
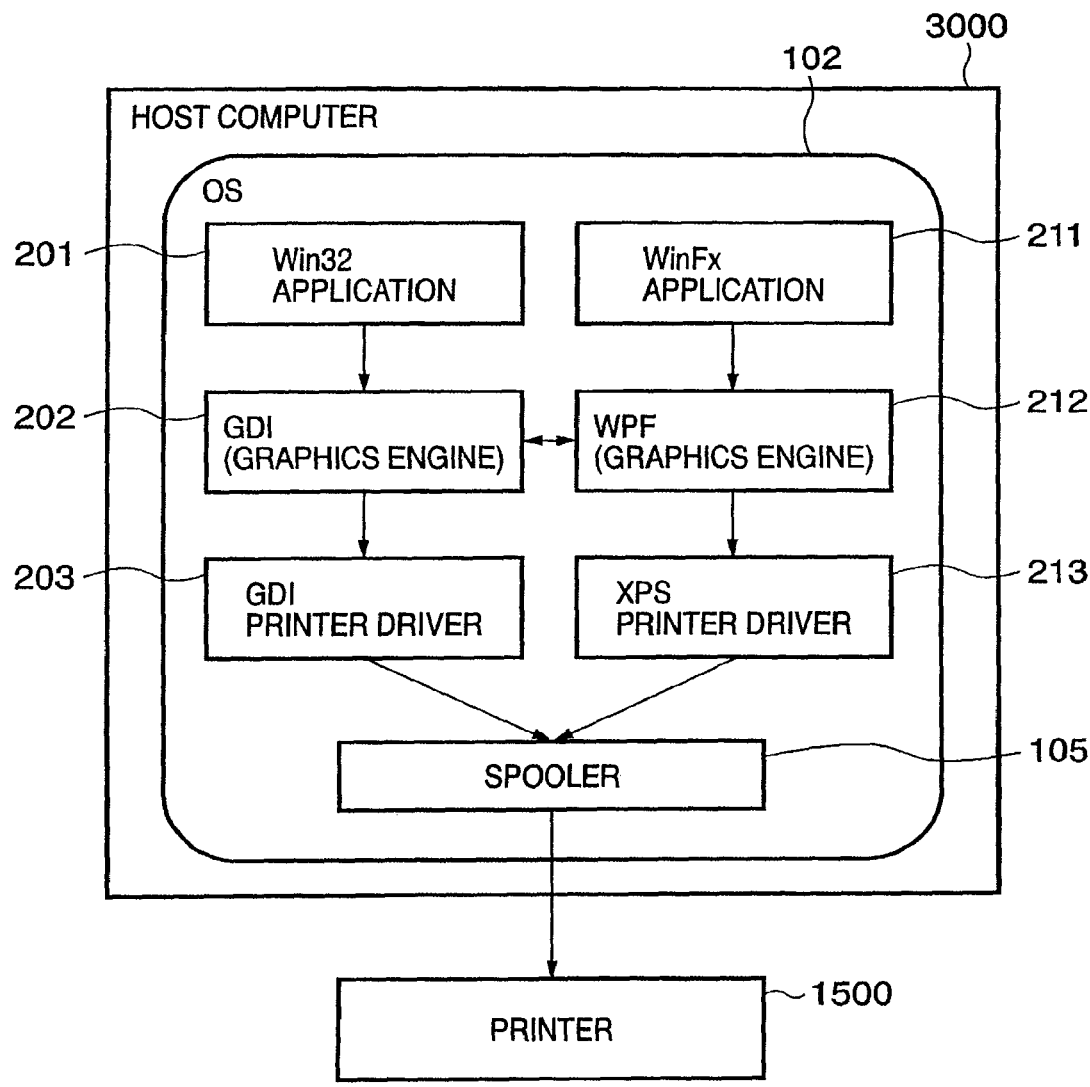
FIG. 2 is a block diagram showing a print process sequence in Windows® Vista which supports a plurality of graphics engines, and components for the print process.

In FIGS. 2 and 3, an information processing apparatus comprises the Win32 application 201 serving as the first application, and the GDI printer driver 203 serving as the first printer driver. The information processing apparatus also comprises the WinFx application 211 serving as the second application, and the XPS printer driver 213 serving as the second printer driver.

The two graphics engines, i.e., the GDI 202 serving as the first graphics unit and the WPF 212 serving as the second graphics unit exist on the OS. The Win32 application passes a GDI function serving as the first graphics data to the GDI 202, while the WinFx application 211 passes WPF API data serving as the second graphics data to the WPF 212.

The GDI printer driver 203 receives graphics data from the GDI 202 and converts it into print data for a printer 1500. The XPS printer driver 213 receives graphics data from the WPF 212 and converts it into print data for the printer 1500. Print data created by the printer driver is transmitted to the printer 1500 via a spooler 105.

In the embodiment, print process paths (2) and (3) accompanied by graphics conversion using the conversion module are generically called a cross path. On the contrary, print process paths (1) and (4) not accompanied by graphics conversion using the conversion module are generically called a straight path.

Figure 4:
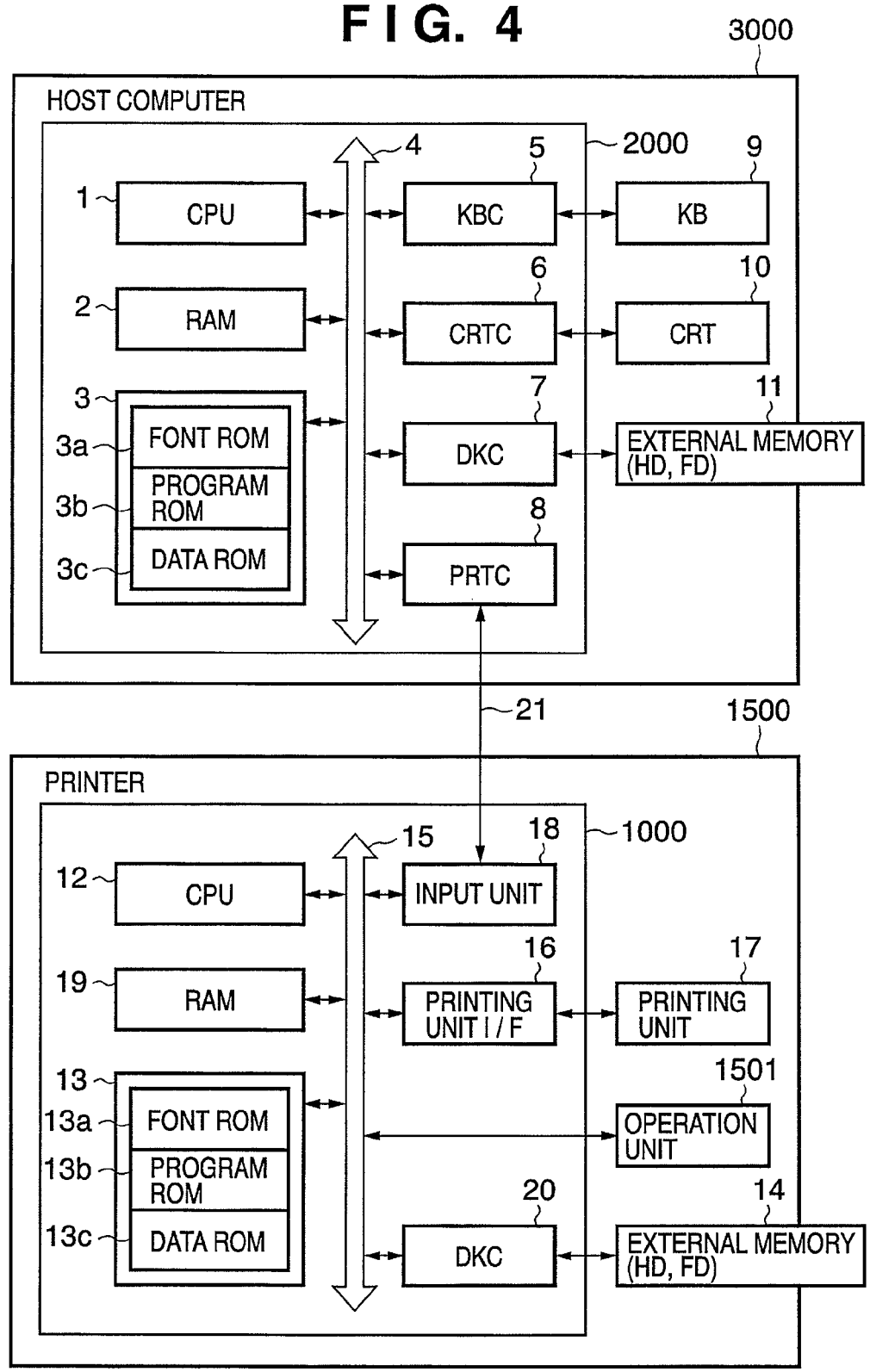
FIG. 4 is a block diagram for explaining the configuration of a printer control system including a computer according to an embodiment of the present invention.

FIG. 4 is a block diagram for explaining the configuration of a printer control system including a computer according to the embodiment of the present invention.

The present invention is applicable to a system having the functions of a single device or formed from a plurality of devices as far as the system can execute the functions of the present invention, unless otherwise specified. The present invention is also applicable to a system which is connected via a network such as a LAN or WAN to perform processes.

In FIG. 4, reference numeral 3000 denotes a host computer having a CPU 1. The CPU 1 processes a document of building elements such as a figure, image, text, table (including a spreadsheet and the like), and the like on the basis of a program such as a document processing program (application program) stored in a program ROM 3b of a ROM 3 or an external memory 11. The CPU 1 comprehensively controls each device connected to a system bus 4 in a host computer main body 2000.

The program ROM 3b of the ROM 3 or the external memory 11 stores programs such as an operating system program (to be referred to as an OS hereinafter) which is a control program for the CPU 1. A font ROM 3a of the ROM 3 or the external memory 11 stores data such as font data used in the document process. A data ROM 3c of the ROM 3 or the external memory 11 stores various data used to perform various processes such as the document process.

Reference numeral 2 denotes a RAM functioning as a main memory, work area, and the like for the CPU 1. Reference numeral 5 denotes a keyboard controller (KBC) which controls a key input from a keyboard (KB) 9 or a pointing device (not shown). Reference numeral 6 denotes a CRT controller (CRTC) which controls display on a CRT display (CRT) 10. An LCD controller and LCD are also available instead of the CRT controller 6 and CRT display 10.

Reference numeral 7 denotes a disk controller (DKC) which controls access to the external memory 11 for a boot program, various applications, font data, user files, edit files, and the like. The DKC 7 also controls access to the external memory 11 (e.g., a hard disk (HD) or floppy® disk (FD)) which stores various data such as a print control command generation program (to be referred to as a printer driver hereinafter).

Reference numeral 8 denotes a printer controller (PRTC) which connects to the printer 1500 via a predetermined bidirectional interface 21, and executes a communication control process with the printer 1500. Examples of the bidirectional interface are a USE interface, IEEE1394 interface, and wireless LAN interface.

The CPU 1 enables WYSIWYG on the CRT 10 by expanding (rasterizing) an outline font in a display information RAM set in, e.g., the RAM 2 to provide a GUI. The CPU 1 opens various registered windows and executes various data processes on the basis of commands designated with the mouse cursor (not shown) or the like on the CRT 10. In printing, the user opens a window associated with print settings, and sets the printer and a printing method to the printer driver including selection of the print mode.

In the printer 1500, reference numeral 12 denotes a printer CPU. The printer CPU 12 comprehensively controls each device connected to a system bus 15 in a printer control unit 1000. The printer CPU 12 outputs an image signal serving as output information to a printing unit (printer engine) 17 connected to the system bus 15 on the basis of a program such as a control program stored in a program ROM 13b of a ROM 13 or an external memory 14.

The program ROM 13b of the ROM 13 stores programs such as a control program for the printer CPU 12. A font ROM 13a of the ROM 13 stores data such as font data used to generate the output information. When the printer does not comprise any external memory 14 such as a hard disk (HD) or IC card, a data ROM 13c of the ROM 13 stores information or the like used in the host computer 3000.

The printer CPU 12 can communicate with the host computer 3000 via an input unit 18, and can notify the host computer 3000 of various types of information such as status information in the printer 1500. Reference numeral 19 denotes a RAM functioning as a main memory, work area, and the like for the CPU 12. The RAM 19 can increase its memory capacity by an optional RAM connected to an expansion port (not shown).

The RAM 19 is used as an output information expansion area, environment data storage area, NVRAM, and the like. A disk controller (DKC) 20 controls access to the external memory 14. The external memory 14 is connected as an option, and stores data such as font data, an emulation program, and form data. Reference numeral 1501 denotes an operation unit having an operation panel, switch, LED display, and the like for various operations to the printer 1500.

The number of external memories 14 is not limited to one, and is at least one. It is possible to connect a plurality of optional font cards, and a plurality of external memories which store a program for interpreting printer control languages of different language systems, in addition to a built-in font. The external memory 14 may have an NVRAM (not shown) to store printer mode setting information from the operation unit 1501.

The printer 1500 connects to one or more PDL devices (PDL boards) to control the PDL device from the CPU 12. The PDL device is an image forming unit having a function of interpreting print data (PDL) received from the host computer 3000 and converting it into bitmap data printable by the printing unit 17. One or more PDL devices are connected as a standard, and a PDL device can also be added later. The PDL device holds IEEE1284 device information used in plug and play.

The information processing apparatus according to the embodiment can generate print data (print job) interpretable by the printer via the printer driver.

In general, the printer 1500 comprises PDL1 as a standard PDL device, and can be expanded by adding another type of PDL such as PDL2 as an optional PDL device.

This expansion may be achieved by physically connecting a dedicated PDL device-mounted expansion board to the printer 1500. If the PDL device is implemented by a program, a program corresponding to the program ROM 13b may be added. It is also possible to store programs corresponding to a plurality of types of PDL devices in the program ROM 13b, and validate and add a necessary PDL device with a license key input by a user operation.

Examples of the PDL are LIPS, PostScript, and PCL.

The printer 1500 applied to the embodiment includes various printing types of printing apparatuses (image forming apparatuses) such as a laser beam printer and inkjet printer. The printer 1500 may be an MFP (Multi Function Peripheral) having a plurality of functions.

The MFP incorporates a storage such as a hard disk capable of storing a plurality of jobs. The MFP has a copy function which allows the printer unit via the storage to print a job output from the scanner unit. The MFP also has a print function which allows the printer unit via the storage to print a job output from an external apparatus such as a PC (Personal Computer). In this manner, the MFP has a plurality of functions including the above ones.

MFPs are classified into full-color MFPs and monochrome MFPs. In many cases, the full-color MFP includes the arrangement of the monochrome MFP at the basic part except for a color processing function, internal data, and the like. The embodiment will explain mainly the full-color MFP, and a description of the monochrome MFP will be added, as needed.

The system described in the embodiment may comprise a multifunction type image forming apparatus (printing apparatus) having a plurality of functions, or an SFP which is a single function type image forming apparatus (printing apparatus) having only the print function. In any case, the system is configured to implement control according to the embodiment.

The SFP stands for Single Function Peripheral.

A functional arrangement executed by the CPU 12 of the printer 1500 will be explained with reference to FIG. 5.

Figure 5:
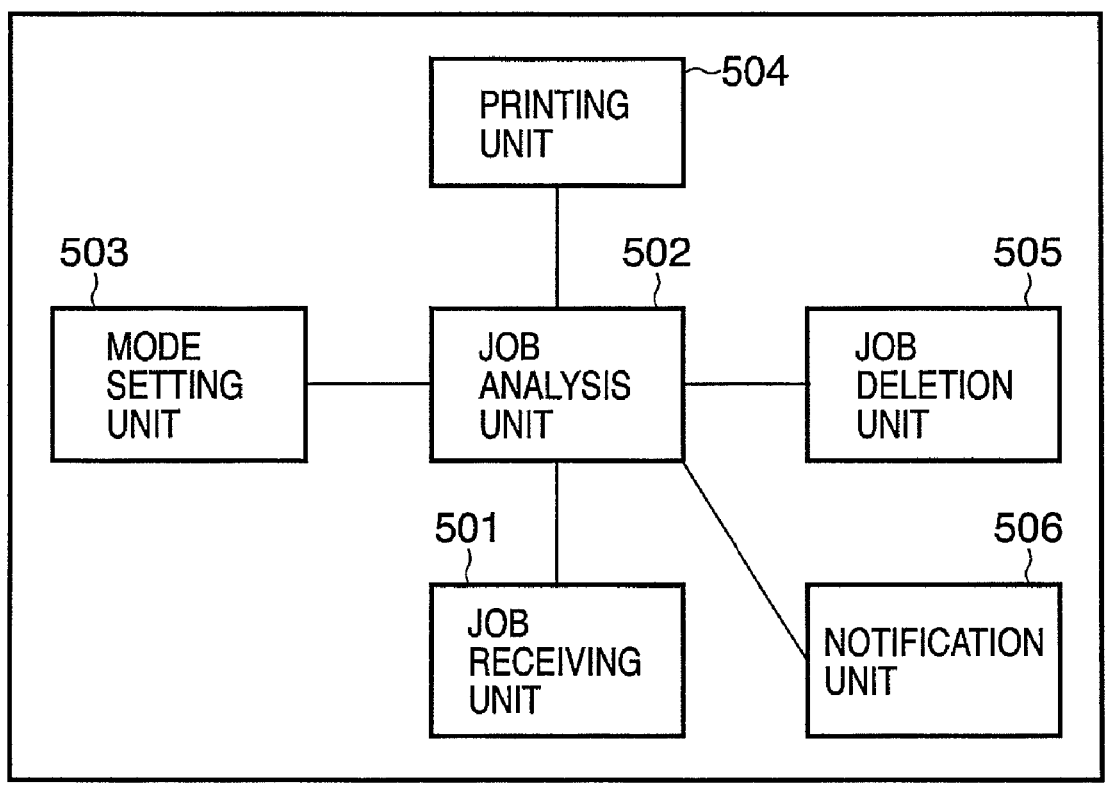
FIG. 5 is a block diagram showing the functional arrangement of a printer according to the embodiment of the present invention.

FIG. 5 is a block diagram showing the functional arrangement of the printer according to the embodiment of the present invention.

A job receiving unit 501 receives a print job from the host computer 3000, and transmits it to a job analysis unit 502. The job analysis unit 502 analyzes the print job to identify a print process sequence (print job generation path) by which the print job was generated according to an identification method to be described later. The print job is synonymous with print data.

The print job processing method is determined in accordance with the process result of the job analysis unit 502 and a mode set by a mode setting unit 503. To print the print job, the print job is transmitted to a printing unit 504 and printed. A job deletion unit 505 cancels the print job in accordance with the process result of the job analysis unit 502. A notification unit 506 gives a notification to the host computer 3000 in accordance with the process result of the job analysis unit 502.

An example of a data process between the host computer 3000 and the printer according to the embodiment will be described with reference to FIG. 6.

Figure 6:
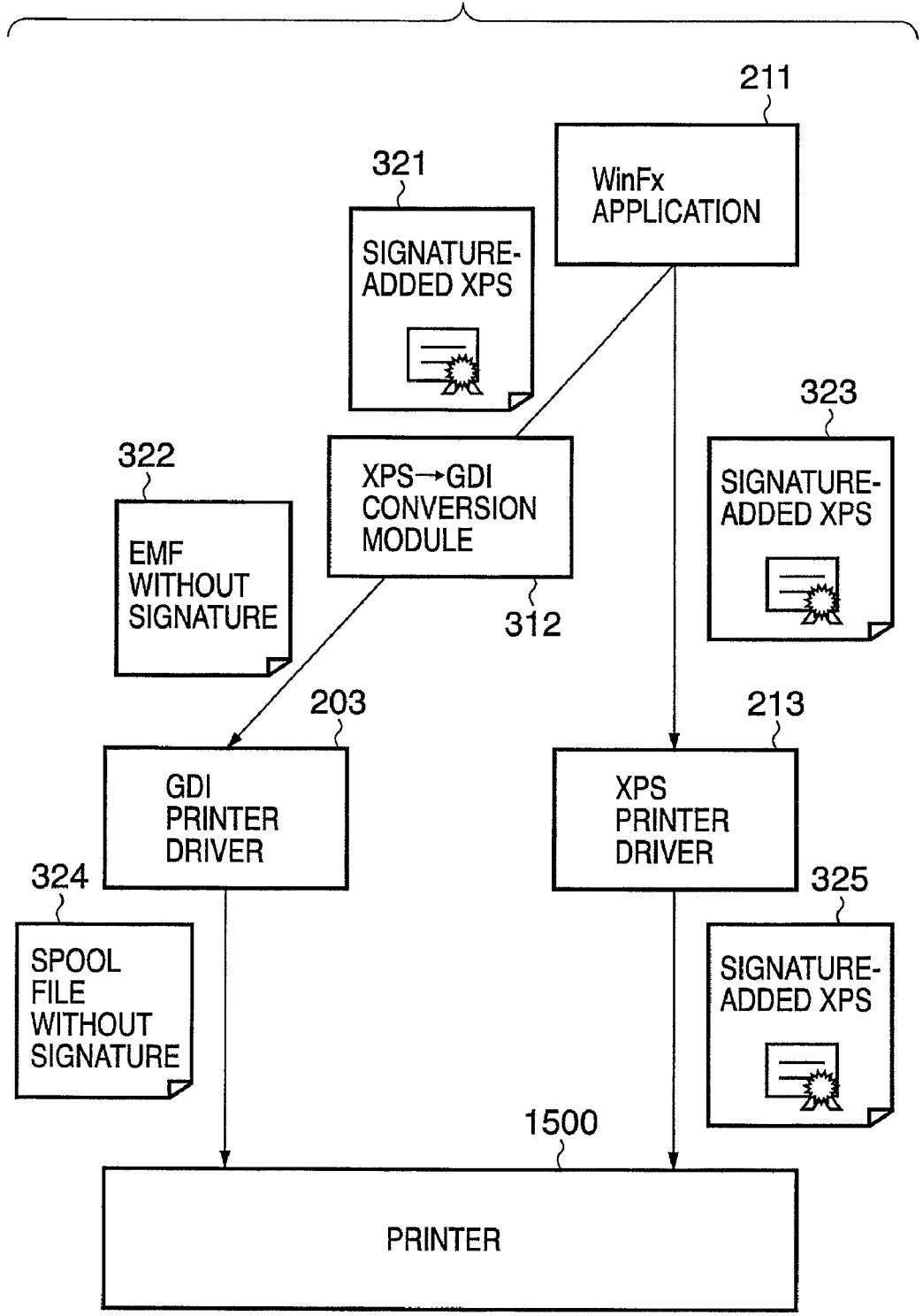
FIG. 6 is a view showing an example of a data process between a host computer and the printer according to the embodiment of the present invention.

FIG. 6 is a view showing an example of the data process between the host computer and the printer according to the embodiment of the present invention.

As described above, there are two print paths along which the WinFx application 211 passes data to the printer 1500 via the GDI printer driver 203 or XPS printer driver 213.

Assume that the WinFx application 211 issues an electronic signature information-added print job.

On the print path via the XPS printer driver 213, the XPS printer driver 213 processes electronic signature information-added graphics data 323. Electronic signature information 325 is transmitted to the printer 1500 together with PDL data converted by the XPS printer driver 213. The format at this time will be described later.

On the print path via the GDI printer driver 203, electronic signature information is lost during conversion into GDI by the XPS→GDI conversion module 312, generating graphics data 322 having no electronic signature information. The GDI printer driver 203 processes the graphics data 322 having no electronic signature information. The graphics data 322 is converted into PDL data 324 having no electronic signature information, which is transmitted to the printer 1500.

The embodiment provides the security function of adaptively controlling inhibition/execution of the print process in a printing environment where electronic signature information may be lost.

To implement the security function, the embodiment adopts the mode setting unit 503 which sets inhibition/execution of the print process on the basis of a path on which a print job created in the host computer is generated. A mode setting window generated by the mode setting unit 503 will be explained with reference to FIG. 7.

Figure 7:
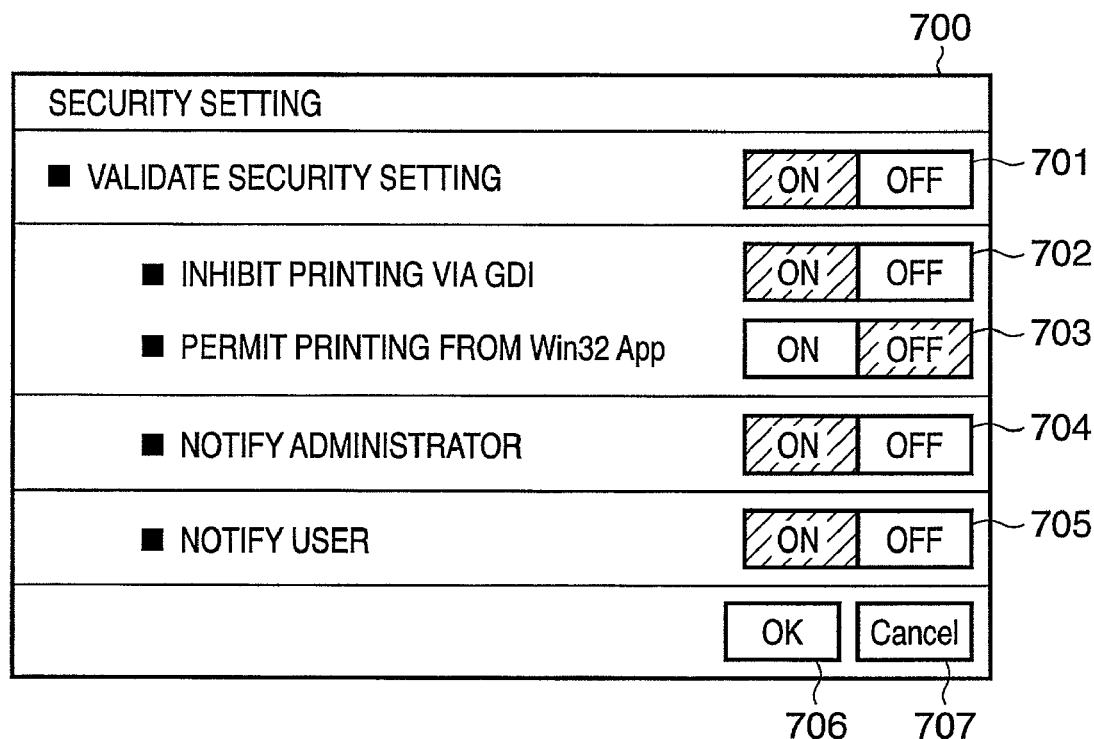
FIG. 7 is a view showing an example of a mode setting window according to the embodiment of the present invention.

FIG. 7 is a view showing an example of the mode setting window of the image forming apparatus according to the embodiment of the present invention.

A mode setting window 700 is displayed on the operation unit 1501 and set by a printer administrator.

Each setting item has buttons to switch between ON and OFF. If the administrator selects either button, the button changes into black representing the selected state.

Reference numeral 701 denotes a button to switch between validation and invalidation of the security setting. When the button 701 is OFF, buttons 702 to 705 are grayed out to inhibit setting to each item and invalidate all settings.

The button 702 is used to set whether to inhibit printing via the GDI. When the button 702 is ON, print jobs processed by print process sequences (1) and (3) are canceled to inhibit printing. When the button 702 is ON but the button 703 is ON, a print job processed by print process sequence (1) is printed. That is, when the button 703 is ON, printing of a print job from the Win32 application is permitted.

Print data generated via the print path of print process sequence (1) in FIG. 3 is printed, whereas print data generated via the print path of print process sequence (3) in FIG. 3 is not printed. It is also possible to inhibit printing of print data generated via the print paths of print process sequences (2) and (3) in FIG. 3 by arranging an "inhibit printing via the cross path" button in the setting window in FIG. 7.

In this manner, the printer according to the embodiment can make settings for the process of print data on each print process path. For example, the window in FIG. 7 can comprise an item to set whether to inhibit printing of print data generated via process path (2) formed from a combination of the Win32 application and XPS driver, or process path (3) formed from a combination of the WinFx application and GDI driver.

The button 704 is used to, when receiving a print job via the GDI, set whether to notify the administrator of the reception by mail. Assume that the administrator's mail address serving as a notification destination has already been set in another window for setting administrator information.

The button 705 is used to, when receiving a print job via the GDI, set whether to notify the administrator of the reception. The notification is unicasted to the IP address of a host computer which transmitted the print job, which will be described later.

The notification methods with the buttons 704 and 705 are merely examples. It is also possible to notify a host computer designated by a message dialog, or output the contents of a notification to a designated printer.

If the administrator operates an OK button 706 in this state, the setting state (mode setting information) in FIG. 7 is stored in, e.g., the RAM 19, and the display of the mode setting window 700 disappears. If the administrator operates a cancel button 707, the setting state in FIG. 7 is canceled, and the display of the mode setting window 700 disappears.

Setting items in the mode setting window 700 shown in FIG. 7 are merely examples, and various setting items can be provided in accordance with the application purpose. The main purpose of the embodiment is to avoid or inhibit a situation in which a print error or illicit printing may occur depending on a print process sequence for use when there are a plurality of types of print process sequences to generate print data. Various setting items can be provided as long as they can achieve this purpose.

A process executed by the printer 1500 will be described with reference to FIG. 8.

Figure 8:
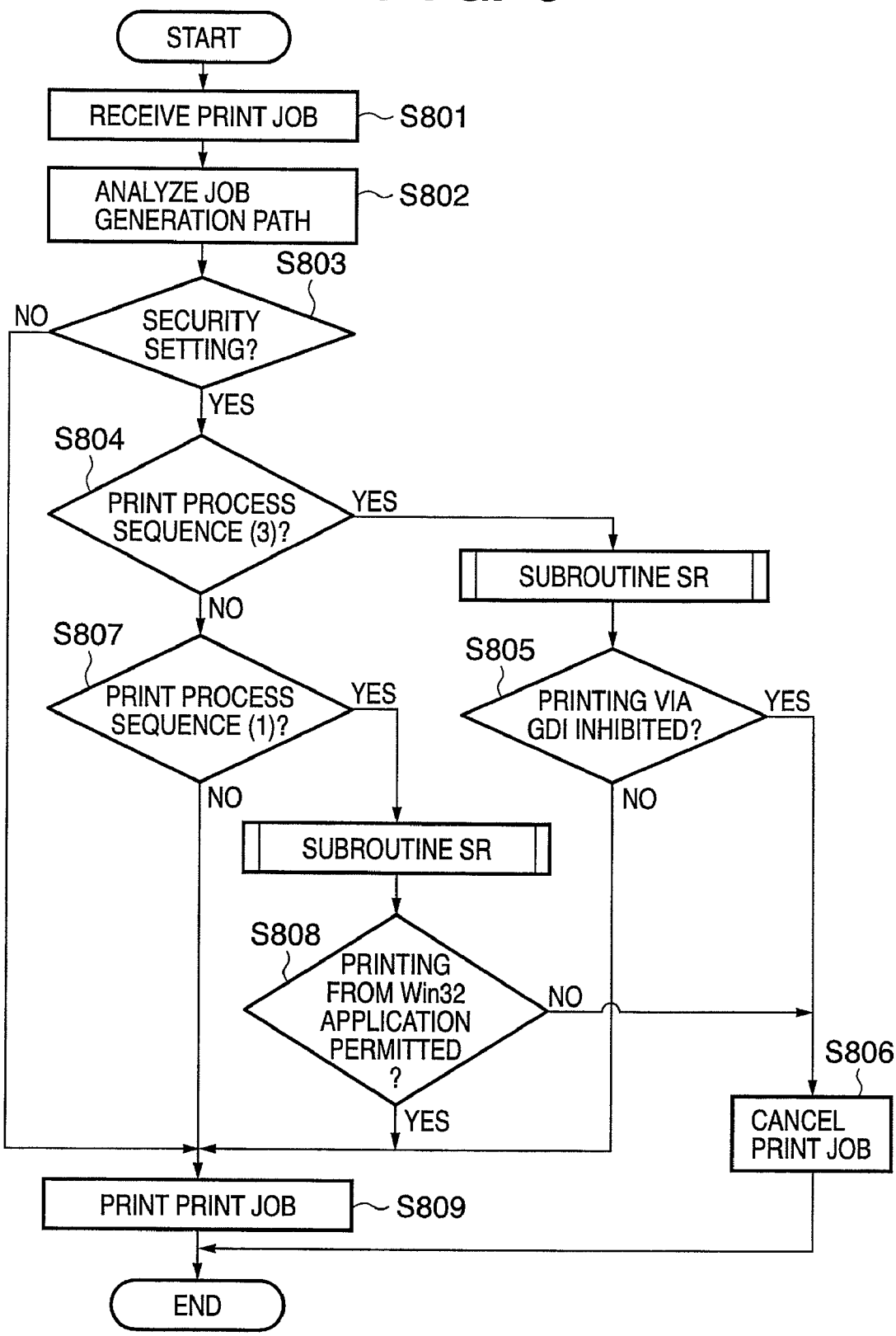
FIG. 8 is a flowchart showing a process executed by the printer according to the embodiment of the present invention.

FIG. 8 is a flowchart showing a process executed by the printer according to the embodiment of the present invention. The CPU 12 of the printer executes the processes of steps in FIG. 8.

FIG. 8 is a flowchart showing a process especially when the printer 1500 receives a print job from the host computer 3000.

In step S801, the job receiving unit 501 receives a print job. In step S802, the job analysis unit 502 analyzes the print job to identify a path (print process sequence (print job generation path)) on which the print job was generated. The job generation path identification method will be described with reference to FIG. 18. In step S803, the mode setting unit 503 refers to mode setting information in the RAM 19 to determine whether the setting value of the button 701 is ON as the security setting.

If the security setting is OFF (NO in step S803), the process advances to step S809 to print the print job, and then ends. If the security setting is ON (YES in step S803), the process advances to step S804, and the job analysis unit 502 determines whether the print job generation path is print process sequence (3).

If the print job generation path is print process sequence (3) (YES in step S804), the printer 1500 executes a subroutine SR to be described later. In step S805, the mode setting unit 503 refers to mode setting information in the RAM 19 to determine whether the setting value of the button 702 is ON as the security setting (inhibition of printing via the GDI).

If inhibition of printing via the GDI is ON (YES in step S805), the process advances to step S806, the printing unit 504 cancels the print job, and then the process ends. If inhibition of printing via the GDI is OFF (NO in step S805), the process advances to step S809, the printing unit 504 prints the print job, and then the process ends.

If the print job generation path is not print process sequence (3) in step S804 (NO in step S804), the process advances to step S807, and the job analysis unit 502 determines whether the print job generation path is print process sequence (1).

If the print job generation path is print process sequence (1) (YES in step S807), the printer 1500 executes the subroutine SR to be described later. In step S808, the mode setting unit 503 refers to mode setting information in the RAM 19 to determine whether the setting value of the button 703 is ON as the security setting (permission of printing from the Win32 application).

If permission of printing from the Win32 application is OFF (NO in step S808), the process advances to step S806, the printer 1500 cancels the print job, and then the process ends. If permission of printing from the Win32 application is ON (YES in step S808), the printing unit 504 prints the print job, and the process ends. In this fashion, the printer 1500 controls the process of received print data on the basis of the analysis result in step S802 and the setting contents of FIG. 7.

By the process in FIG. 8, the CPU 12 of the printer 1500 controls to inhibit printing of print data when the analysis result in step S802 reveals that a combination of an application and printer driver is a specific one and it is set to inhibit printing in the case of this specific combination. Accordingly, the printer 1500 can prevent degradation of confidentiality, print quality, and the like.

Details of the subroutine SR in FIG. 8 will be described with reference to FIG. 9.

Figure 9:
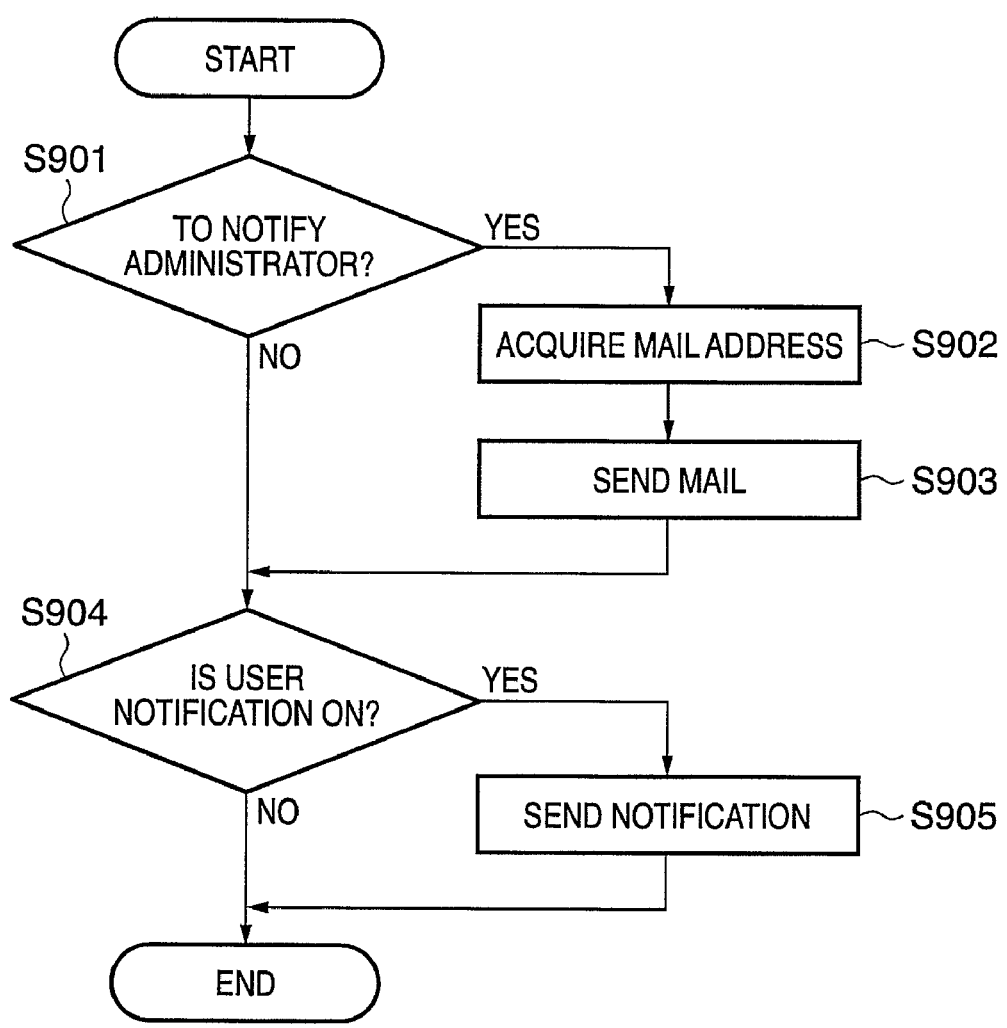
FIG. 9 is a flowchart showing details of the process of a subroutine SR according to the embodiment of the present invention.

FIG. 9 is a flowchart showing details of the process of the subroutine SR according to the embodiment of the present invention.

In step S901, the mode setting unit 503 refers to mode setting information in the RAM 19 to determine whether the setting value of the button 704 is ON as the security setting (administrator notification).

If the administrator notification is OFF (NO in step S901), the process advances to step S904. If the administrator notification is ON (YES in step S901), the process advances to step S902, and the notification unit 506 acquires a preset administrator's mail address. In step S903, the notification unit 506 sends mail to the acquired administrator's mail address. After that, the process advances to step S904. FIG. 10 shows an example of the mail.

Assume that the user generates data with electronic signature information by the WinFx application. When the user selects the GDI printer driver via the WinFx application, the electronic signature added to the data generated by the WinFx application is deleted, losing security.

When the printer analyzes that the received print data was generated by print process sequence (3), it determines that electronic signature information may be omitted, as described above. To notify the administrator that the print data was generated using an undesirable printer driver, the printer generates mail as shown in FIG. 10 and sends it to the administrator.

In step S904, the mode setting unit 503 refers to mode setting information in the RAM 19 to determine whether the setting value of the button 705 is ON as the security setting (user notification).

If the setting value of the button 705 is OFF (user notification is OFF) (NO in step S904), the process ends. If the setting value of the button 705 is ON (user notification is ON) (YES in step S904), the process advances to step 5905, and the notification unit 506 unicasts a notification message to the host computer 3000 which transmitted the print job. Then, the process ends.

FIG. 11 shows an example of the notification message. In FIG. 11, reference numeral 1101 denotes an integer which is incremented by one every time printer configuration information changes or a print job is canceled. The host computer 3000 acquires this value and can detect that the above-mentioned event has occurred in the printer 1500.

The printer 1500 sends the notification message in FIG. 11 upon reception of a print job from the host computer 3000 via the GDI while the setting values of the buttons 701, 702, and 705 are ON as security settings. In response to this, for example, the GDI printer driver in the host computer 3000 is uninstalled to inhibit subsequent printing from being executed via the GDI.

The GDI printer driver uninstallation process will be explained with reference to FIG. 12.

FIG. 12 is a chart showing the GDI printer driver uninstallation sequence according to the embodiment of the present invention.

In 1201, the printer 1500 transmits a notification message to the host computer 3000.

In 1202, the host computer 3000 transmits a device information request to the printer 1500. Upon reception of the device information request, the printer 1500 generates device information in 1203 by a method to be described later, and transmits the generated device information to the host computer 3000 in 1204.

FIG. 13 shows an example of the device information. As shown in FIG. 13, the device information contains a list of services (functions (e.g., types of image forming units (PDL devices))) provided by the device. The value of the <ServiceId> element in FIG. 13 is a unique ID, i.e., identifier to identify each service, and is used to specify a service later.

In 1205, the host computer 3000 designates a necessary service ID from the received device information, and transmits a service information request. Upon reception of the service information request, the printer 1500 transmits service information containing the value of IEEE1284 device information corresponding to the designated service ID to the host computer 3000 in 1206. FIG. 14 shows an example of the service information.

If the printer 1500 transmits device information containing a plurality of service lists to the host computer 3000 in 1204, the sequence of 1205 and 1206 is repeated.

In 1207, the host computer 3000 refers to the service information received from the printer 1500, and uninstalls a printer driver corresponding to DeviceID which has not been sent back from the printer.

A process when the printer 1500, which has received a device information request, generates device information in 1203 of FIG. 12 will be explained with reference to FIG. 15.

FIG. 15 is a flowchart showing a process when the printer, which has received a device information request, generates device information according to the embodiment of the present invention.

In step S1501, the printer 1500 receives a device information request. In step S1502, the printer 1500 acquires one printable PDL from a PDL list of PDL devices supported by the printer. In step S1503, the printer 1500 adds, to device information, a service entry corresponding to a service with DeviceID for the XPS driver corresponding to the acquired PDL device. That is, in step S1503, the printer 1500 adds information that the XPS printer driver corresponding to the acquired PDL is valid.

In step S1504, the printer 1500 refers to mode setting information in the RAM 19, and acquires the setting values of the buttons 701 and 702 as security settings to determine whether GDI printing is acceptable. If no GDI printing is acceptable (NO in step S1504), the process advances to step S1506.

If GDI printing is acceptable (YES in step S1504), the process advances to step S1505 to add, to the device information, a service entry corresponding to a service with DeviceID for the GDI driver corresponding to the acquired PDL. That is, in step S1505, the printer 1500 adds, to the device information, information that the GDI printer driver corresponding to the acquired PDL is valid.

In step S1506, the printer 1500 determines whether the process has ended for all PDL devices in the PDL list. If the process has not ended for all PDL devices (NO in step S1506), the process returns to step S1502 to acquire an unprocessed PDL device and execute the above-described process. If the process has ended for all PDL devices (YES in step S1506), the process advances to step S1507 to transmit the generated device information to the host computer 3000, and then ends.

By the above process, the printer 1500 can designate a printer driver which generates print data processible by the printer 1500. For example, if the printer 1500 determines in step S1504 that GDI printing is impossible (NO in step S1504), no GDI printer driver is added as a valid printer driver to device information.

Upon reception of this device information, the host computer can determine not to generate any print data via the GDI printer driver because the device information does not contain any GDI printer driver. This can prevent transmission, to the printer, of print data from which electronic signature information added to data generated by, e.g., the WinFx application is deleted.

In other words, the host computer can control the printer driver in accordance with device information sent from the device. For example, the host computer can specify a printer driver not contained in the received device information among printer drivers held in the host computer, and uninstall the specified printer driver. The printer can notify the host computer of identification information representing a printer driver capable of generating printable data.

Figure 19:
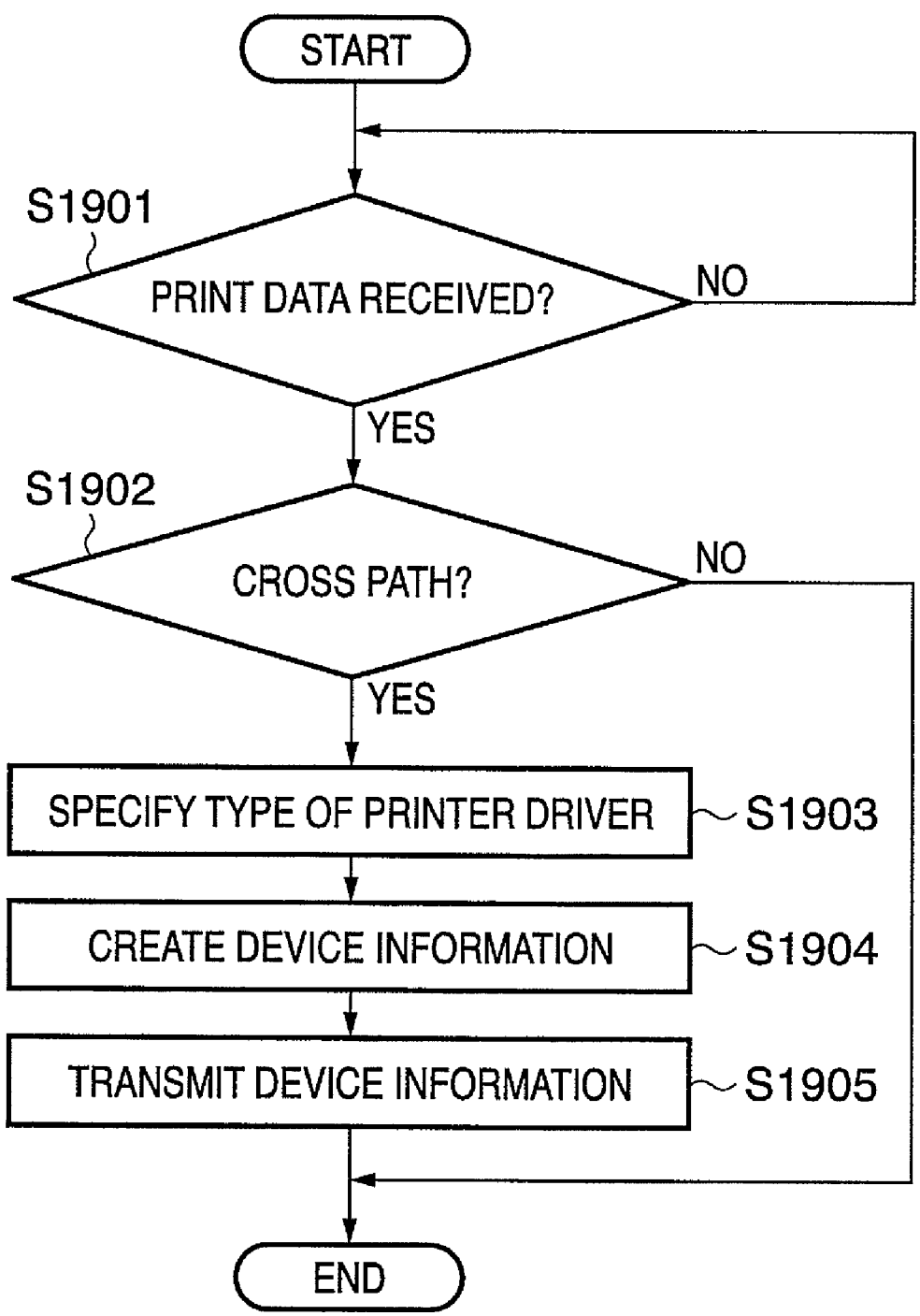
FIG. 19 is a flowchart showing a process by the printer according to the embodiment of the present invention.

A process when the printer recommends a desirable printer driver using the process in FIG. 12 upon reception of print data generated via the cross pass will be explained with reference to FIG. 19. In this case, the uninstallation process shown in FIG. 12 may not be executed.

The printer 1500 determines whether it has received print data (step S1901). If the printer 1500 has received print data (YES in step S1901), it determines whether the print data was generated via the cross path (step S1902). The method of analyzing whether print data was generated via the cross path will be described later with reference to FIG. 18.

If the job analysis unit 502 determines upon analysis in step S1902 that the print data was generated via the cross path (YES in step S1902), it specifies the type of printer driver capable of generating print data without any conversion by the graphics module (step S1903). Specifically, the job analysis unit 502 can determine the type of print requesting application by using the process in FIG. 18.

More specifically, the job analysis unit 502 determines whether the requesting application is the WinFx application or Win32 application. Based on this result, the printer specifies the type of printer driver not accompanied by graphics conversion. When the print requesting source is the WinFx application, the printer specifies the XPS printer driver. When the print requesting source is the Win32 application, the printer specifies the GDI printer driver.

The printer creates device information containing the printer driver specified in step S1903 (step S1904). The printer transmits the device information to the host computer (step S1905).

The process in step S1903 will be exemplified. For example, when printer A determines that GDI printer driver A generated print data via the cross path, it specifies XPS printer driver A as a desirable printer driver. Printer A transmits device information containing specified XPS printer driver A to the host computer, so the user can switch the printer driver to a desirable one recommended by the printer. This can prevent degradation of the print quality or illicit printing as much as possible.

The printer notifies the device information created in step S1904 to a transmitting side indicated by the message transmitting side information contained in a device search message (1202 in FIG. 12).

The method of identifying a path on which a print job was generated when the printer 1500 receives the print job will be explained.

Before a description of this identification method, the arrangement of the XPS printer driver 213 will be described with reference to FIG. 16A.

Figure 16A:
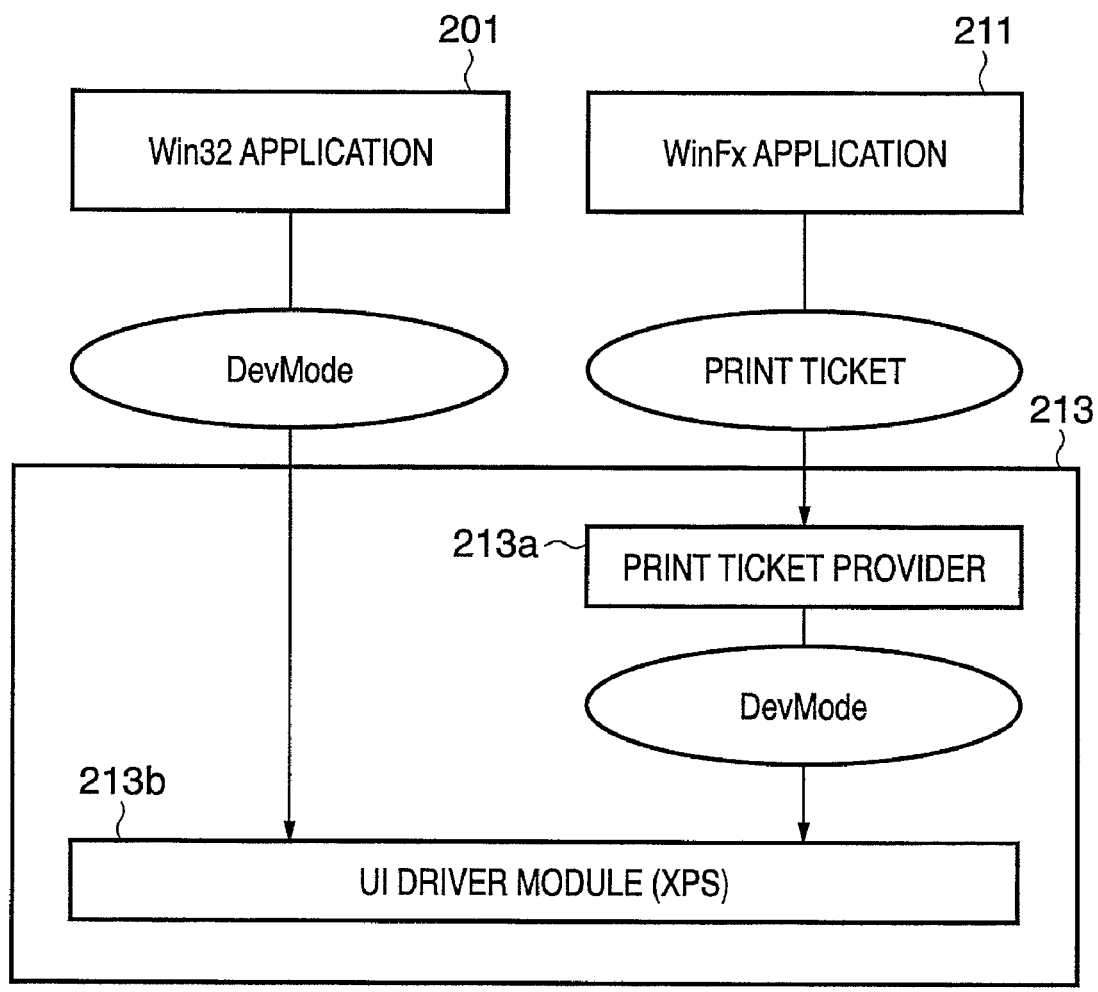
FIG. 16A is a block diagram showing the arrangement of an XPS printer driver according to the embodiment of the present invention.

FIG. 16A is a block diagram showing the arrangement of the XPS printer driver according to the embodiment of the present invention.

In the environment shown in FIG. 2, print setting data is held with a data structure called a DEVMODE structure on the GDI print path. Print setting data is held with an XML data structure called PrintTicket on the XPS print path. Conversion from GDI into XPS or from XPS into GDI requires conversion from DEVMODE into PrintTicket or from PrintTicket into DEVMODE.

Similar to graphics data, the DEVMODE expressible range and PrintTicket expressible range are different from each other. This process is done not automatically by the operating system but by the printer driver itself using an extended architecture.

The XPS printer driver 213 holds a print ticket provider 213a and UI driver module (XPS) 213b. The UI driver module (XPS) 213b is based on DEVMODE, and displays a UI for setting print setting information in response to a call from an application. The print ticket provider 213a converts PrintTicket (print ticket) into DEVMODE or DEVMODE into PrintTicket.

In FIG. 16A, when the Win32 application 201 requests DEVMODE for print settings, the XPS printer driver 213 is based on DEVMODE and does not require any conversion. If the Win32 application 201 prints using the XPS printer driver 213, the print ticket provider 213a need not perform any conversion.

To the contrary, the WinFx application 211 requests a print ticket for print settings. The XPS printer driver 213 does not hold any print ticket, and the print ticket provider 213a converts the print ticket into DEVMODE.

The XPS printer driver 213 can recognize the conversion process of the print ticket provider 213a. If the print ticket provider 213a converts a print ticket into DEVMODE upon accepting data to be printed, the XPS printer driver 213 can determine that the print setting requesting source is the WinFx application 211. If the print ticket provider 213a does not execute any conversion upon accepting data to be printed, the XPS printer driver 213 can determine that the print setting requesting source is the Win32 application 201.

The GDI printer driver 203 is identical in structure to the XPS printer driver 213, and comprises a UI driver module (GDI) equivalent to the UI driver module (XPS) 213b.

The GDI printer driver 203 can recognize the conversion process of the print ticket provider 213a, similar to the XPS printer driver 213. The GDI printer driver 203 can determine the process path of data to be printed and a print setting requesting application.

In FIG. 3, graphics data in a print job passed from the WinFx application 211 to the GDI printer driver 203 is automatically converted by the XPS→GDI conversion module 312 under the control of the OS 102. Thus, the GDI printer driver 203 cannot detect that the graphics data has been converted.

On the contrary, print setting data of a stapling process or the like cannot be automatically converted by the OS 102. Instead, the UI driver module 213b of the XPS printer driver 213 converts PrintTicket passed from the WinFx application 211 into DEVMODE interpretable by the GDI printer driver 203.

When automatically converting graphics data, the OS 102 passes PrintTicket to the UI driver module 213b of the GDI printer driver 203 in order to ask the GDI printer driver 203 to convert print settings. After acquiring PrintTicket from the OS 102, the UI driver module 213b converts the received XML PrintTicket information into DEVMODE. At this time, the UI driver module 213b sets, in DEVMODE, a conversion flag representing that the XPS→GDI conversion module 312 has executed conversion.

A concrete example of this process result will be described with reference to FIG. 16B.

FIG. 16B is a view for explaining how to set the conversion flag representing that conversion has been executed when PrintTicket is converted into DEVMODE according to the embodiment of the present invention.

Reference numeral 1601 denotes PrintTicket passed from the OS to the UI driver module 213b of the XPS printer driver 213. The PrintTicket 1601 is expressed in the XML format, and holds information on print settings such as the paper size and execution/non-execution of double-sided printing.

Information converted from the PrintTicket 1601 is DEVMODE 1602. The DEVMODE 1602 holds print settings used by the GDI printer driver 203, and shows the paper size, execution/non-execution of double-sided printing, and the like, similar to the PrintTicket 1601.

The conversion flag of the XPS→GDI conversion module 312 is dmConvertFlag 1603. By designating DM_CNV_PT-TODEVMODE in conversion by the GDI printer driver, the print ticket provider records that XPS→GDI conversion has been executed. DM_CNV_NONE is designated for DEVMODE having undergone no XPS→GDI conversion.

The format of print data generated from DEVMODE and graphics data by the GDI printer driver will be described with reference to FIG. 17.

Figure 17:
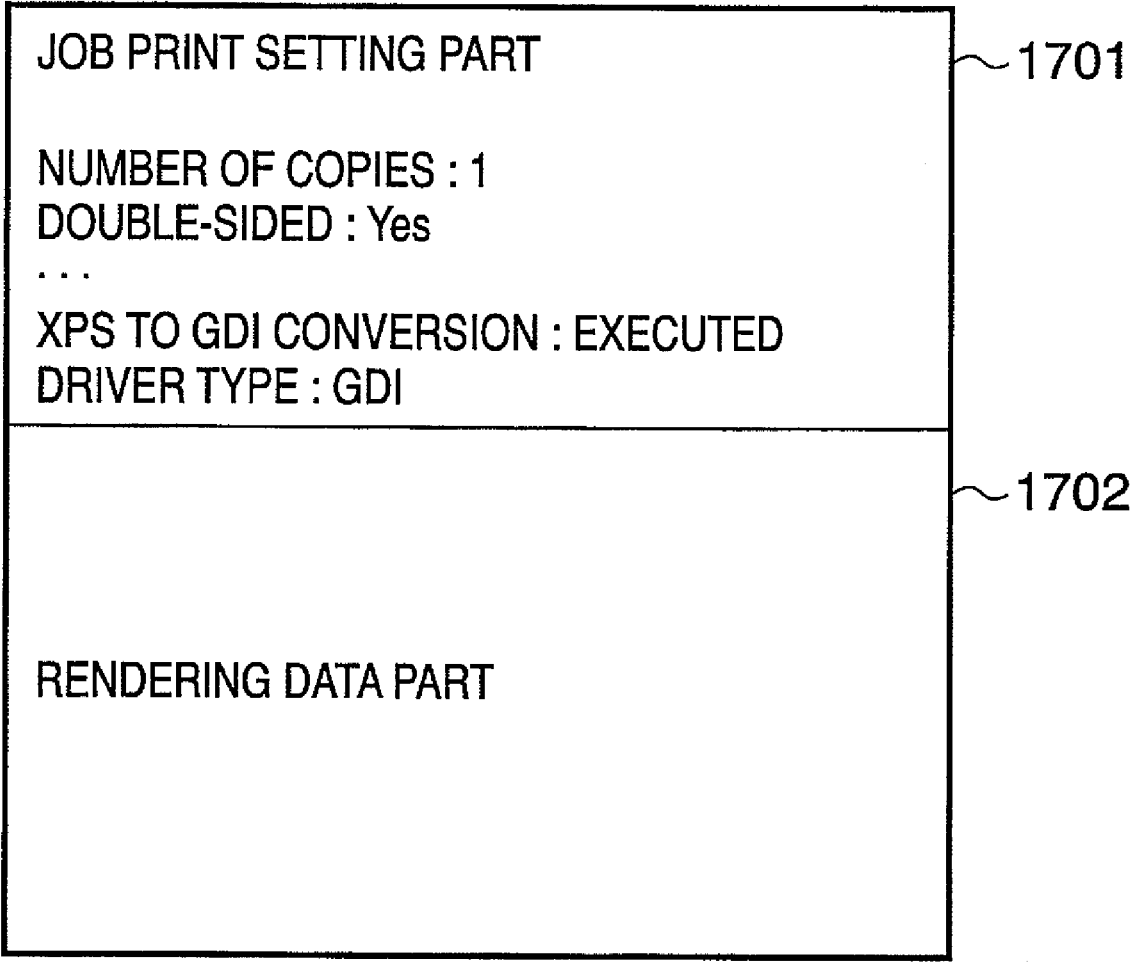
FIG. 17 is a view showing the format of print data generated by a GDI printer driver according to the embodiment of the present invention.

FIG. 17 is a view showing the format of print data generated by the GDI printer driver according to the embodiment of the present invention.

Print data is made up of a job print setting part 1701 and graphics data part 1702. The job print setting part 1701 contains information on print settings such as the number of copies and double-sided printing, and in addition a conversion flag representing execution/non-execution of XPS→GDI conversion, and information on the driver type (GDI or XPS) of print data. The printer 1500 analyzes print data (e.g., PDL data) to extract the conversion flag and driver type information, determining a print process sequence (print job generation path) by which the print job was generated.

When the GDI printer driver determines that conversion from the print ticket into DEVMODE has been executed, it can determine that the print requesting source is the WinFx application. Hence, the GDI printer driver generates print data describing that XPS GDI conversion has been executed and the driver type is GDI, as shown in FIG. 17. If the GDI printer driver determines that no conversion from the print ticket into DEVMODE has been executed, it can determine that the print requesting source is the Win32 application. In this case, the GDI printer driver generates print data describing that no XPS→GDI conversion has been executed and the driver type is GDI.

Print data generated by the XPS printer driver will also be explained.

When receiving a print request from the WinFx application, the XPS printer driver can print normally without degrading either the print function or graphics result, as described above. When the XPS printer driver determines that conversion from the print ticket into DEVMODE has been executed, it can determine that the print requesting source is the WinFx application, as described with reference to FIG. 16A.

In this case, the XPS printer driver generates print data describing that no GDI→XPS conversion has been executed and the driver type is XPS. If the XPS printer driver determines that no conversion from the print ticket into DEVMODE has been executed, it can determine that the print requesting source is the Win32 application. In this case, the XPS printer driver generates print data describing that print data has undergone GDI→XPS conversion and the driver type is XPS.

In this way, print data received by the printer contains information representing execution/non-execution of the graphics data conversion process, and the driver type of a designated printer driver. Based on the received print data, the job analysis unit 502 analyzes the combination of an application and printer driver used to generate the print data.

Details of the process in step S802 of FIG. 8 will be explained with reference to FIG. 18.

Figure 18:
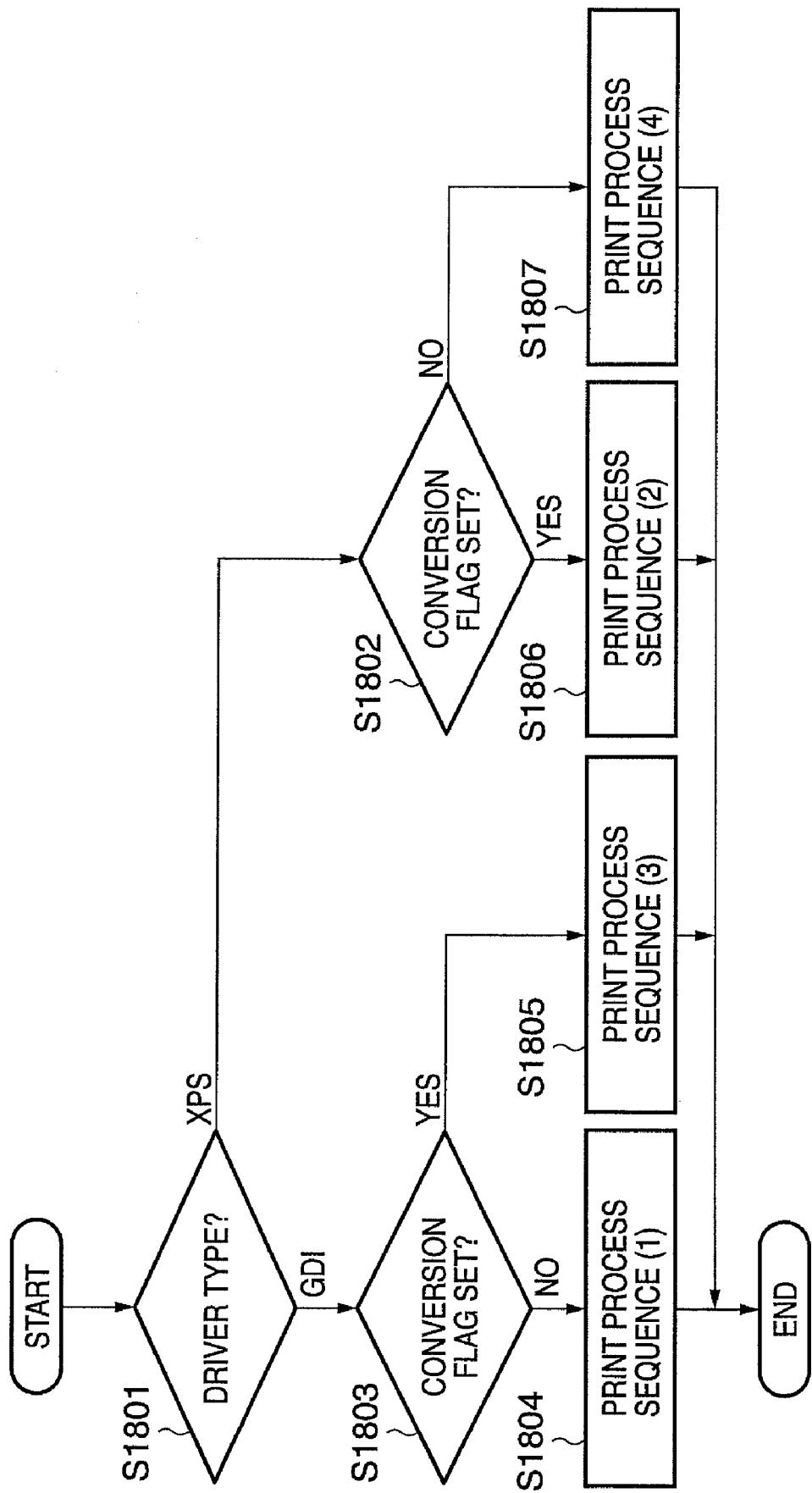
FIG. 18 is a flowchart showing details of the process in step S802 according to the embodiment of the present invention.

FIG. 18 is a flowchart showing details of the process in step S802 according to the embodiment of the present invention.

In particular, the process to determine the job generation path (print process sequence) of a received print job by the printer 1500 will be described.

In step S1801, the job analysis unit 502 identifies a driver type contained in the job print setting part 1701 of print data. As shown in FIG. 17, the print data received by the printer describes the driver type. If the driver type is XPS, the process advances to step S1802.

In step S1802, the job analysis unit 502 determines whether the conversion flag is set. If the conversion flag is set (YES in step S1802), i.e., the job analysis unit 502 determines that "GDI→XPS conversion has been executed", the process advances to step S1807 to determine that the print process sequence is (4). If no conversion flag is set (NO in step S1802), the process advances to step S1806 to determine that the print process sequence is (2).

If the driver type is GDI, the process advances to step S1803, and the job analysis unit 502 determines whether the conversion flag is set. If the conversion flag is set (YES in step S1803), i.e., the job analysis unit 502 determines that "XPS→GDI conversion has been executed", the process advances to step S1805 to determine that the print process sequence is (3).

If no conversion flag is set (NO in step 51803), the process advances to step S1804 to determine that the print process sequence is (1). In this manner, the printer can determine a print process requesting application on the basis of the driver type and graphics data conversion flag which are contained in print data. As a result of the specifying process, the printer controls to inhibit print data when analyzing that the print data was not generated via the straight path.

The embodiment has exemplified the security setting using electronic signature information as information which is omitted by XPS→GDI conversion. With the same arrangement, the present invention can cope with even the problem of the print quality in addition to the print restriction for security.

As described above, according to the present invention, the printer can adaptively change the process contents by identifying information on a path on which a print job was generated. For example, when printing via the GDI is inhibited (the button 702 is ON) in FIG. 7 and printing from the Win32 application is permitted (the button 703 is ON), the printer cancels (inhibits) the print process upon determining that the print process sequence is (3).

When the security setting is valid (the button 701 is ON) in FIG. 7 and both the buttons 703 and 704 are ON, the printer may cancel the print process via print process sequence (2). In this case, if the job analysis unit analyzes received print data to determine that the driver type is XPS and GDI→XPS conversion has been executed, it can determine that the print process sequence is (2), canceling the print process.

Based on received print data, the printer can analyze whether the print data was generated via a process path formed from a combination of the Win32 application and GDI printer driver. Also, based on received print data, the printer can analyze whether the print data was generated via a process path formed from a combination of the WinFx application and XPS printer driver.

The printer can inhibit printing of a print job which may not ensure security or a print job which may degrade the print quality. Accordingly, the embodiment can provide a printing system which prevents any attempt to avoid the security restriction and print, and prevents a situation in which results do not meet a user's request due to poor print quality to wastefully use sheets.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then-executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-75550 filed on Mar. 17, 2006, which is hereby incorporated by reference herein in its entirety.

What is claimed is:

1. A system including an information processing apparatus that operates a first graphics unit that generates first graphics data processible by a first printer driver in accordance with a print instruction from a first application, and a second graphics unit that generates second graphics data processible by a second printer driver in accordance with a print instruction from a second application, and an image forming apparatus that prints by receiving print data generated by the information processing apparatus, wherein the information processing apparatus comprises:

a transmitting unit for transmitting first print data generated by the first printer driver in accordance with the print instruction from the first application, or transmitting second print data generated by the second printer driver in accordance with the print instruction from the second application, wherein the first print data is generated by the first printer driver based on the first graphics data converted from the second graphics data, and the second print data is generated by the second printer driver based on the second graphics data, and wherein the image forming apparatus comprises:

a receiving unit for receiving the first print data or the second print data from the information processing apparatus; and a control unit for controlling to print based on the second print data in a case that the receiving unit receives the second print data, and to inhibit printing of the first print data in a case that the receiving unit receives the first print data; and a setting unit for setting a security setting, wherein when the security setting is set, and the first print data has been generated by converting the second graphics data into the first graphics data and outputting the first graphics data to the first printer driver, said control unit inhibits printing of the first print data received by said receiving unit, when the security setting is not set, and the first print data has been generated by converting the second graphics data into the first graphics data and outputting the first graphics data to the first printer driver, said control unit executes printing of the first print data received by said receiving unit.

2. The system according to claim 1, further comprising a notification unit, wherein in the case that first print data has been generated by converting the second graphics data into the first graphics data and outputting the first graphics data to the first printer driver, the notification unit notifies by a mail that an undesirable printer driver for the information processing apparatus has been used.

3. A method of controlling a system which includes an information processing apparatus that operates a first graphics unit that generates first graphics data processible by a first printer driver in accordance with a print instruction from a first application, and a second graphics unit that generates second graphics data processible by a second printer driver in accordance with a print instruction from a second application, and which includes an image forming apparatus that prints by receiving print data generated by the information processing apparatus, wherein in the information processing apparatus, the method comprises:

a transmitting step of transmitting first print data generated by the first printer driver in accordance with the print instruction from the first application, or transmitting second print data generated by the second printer driver in accordance with the print instruction from the second application, wherein the first print data is generated by the first printer driver based on the first graphics data converted from the second graphics data, and the second print data is generated by the second printer driver based on the second graphics data, and wherein in the image forming apparatus, the method comprises:

a receiving step of receiving the first print data or the second print data from the information processing apparatus; and a control step of controlling to print based on the second print data in a case that the receiving step receives the second print data, and to inhibit printing of the first print data in a case that the receiving step receives the first print data; and a setting step for setting a security setting, wherein when the security setting is set, and the first print data has been generated by converting the second graphics data into the first graphics data and outputting the first graphics data to the first printer driver, said control unit inhibits printing of the first print data received by said receiving step, when the security setting is not set, and the first print data has been generated by converting the second graphics data into the first graphics data and outputting the first graphics data to the first printer driver, said control unit executes printing of the first print data received by said receiving step.

4. The method according to claim 3, further comprising, a notification step, wherein in the case that first print data has been generated by converting the second graphics data into the first graphics data and outputting the first graphics data to the first printer driver, the notification step notifies by a mail that an undesirable printer driver for the information processing apparatus has been used.

5. A non-transitory computer-readable storage medium storing a computer-executable program which causes a computer to control a system which includes an information processing apparatus that operates a first graphics unit that generates first graphics data processible by a first printer driver in accordance with a print instruction from a first application, and a second graphics unit that generates second graphics data processible by a second printer driver in accordance with a print instruction from a second application, and which includes an image forming apparatus that prints by receiving print data generated by the information processing apparatus, wherein the program causes the information processing apparatus to perform:

a transmitting step of transmitting first print data generated by the first printer driver in accordance with the print instruction from the first application, or transmitting second print data generated by the second printer driver in accordance with the print instruction from the second application, wherein the first print data is generated by the first printer driver based on the first graphics data converted from the second graphics data, and the second print data is generated by the second printer driver based on the second graphics data, and wherein the program causes the image forming apparatus to perform:

a receiving step of receiving the first print data or the second print data from the information processing apparatus; and a control step of controlling to print based on the second print data in a case that the receiving step receives the second print data, and to inhibit printing of the first print data in case that the receiving step receives the first print data; and a setting step for setting a security setting, wherein when the security setting is set, and the first print data has been generated by converting the second graphics data into the first graphics data and outputting the first graphics data to the first printer driver, said control unit inhibits printing of the first print data received by said receiving step, when the security setting is not set, and the first print data has been generated by converting the second graphics data into the first graphics data and outputting the first graphics data to the first printer driver, said control unit executes printing of the first print data received by said receiving step.

6. The storage medium according to claim 5, further comprising a notification step, wherein in the case that first print data has been generated by converting the second graphics data into the first graphics data and outputting the first graphics data to the first printer driver, the notification step notifies by a mail that an undesirable printer driver for the information processing apparatus has been used.

* * * * *